(12) United States Patent
Horvitz et al.

(10) Patent No.: US 9,398,420 B2
(45) Date of Patent: Jul. 19, 2016

(54) COMPUTING AND HARNESSING INFERENCES ABOUT THE TIMING, DURATION, AND NATURE OF MOTION AND CESSATION OF MOTION WITH APPLICATIONS TO MOBILE COMPUTING AND COMMUNICATIONS

(71) Applicant: Microsoft Corporation, Redmond, WA (US)

(72) Inventors: Eric J. Horvitz, Kirkland, WA (US); Murugesan S. Subramani, Sammamish, WA (US); Johnson T. Apacible, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 110 days.

(21) Appl. No.: 14/148,544

(22) Filed: Jan. 6, 2014

(65) Prior Publication Data

US 2014/0120954 A1 May 1, 2014

Related U.S. Application Data

(60) Division of application No. 12/565,834, filed on Sep. 24, 2009, now Pat. No. 8,626,433, which is a continuation of application No. 11/428,170, filed on Jun. 30, 2006, now Pat. No. 7,617,042.

(51) Int. Cl.
*H04W 4/02* (2009.01)
*G08G 1/01* (2006.01)

(52) U.S. Cl.
CPC *H04W 4/027* (2013.01); *G08G 1/01* (2013.01)

(58) Field of Classification Search
CPC ........... G08G 1/00; G08G 1/165; G08G 1/01; H04W 4/027
See application file for complete search history.

(56) References Cited

U.S. PATENT DOCUMENTS

| | | | |
|---|---|---|---|
| 5,444,442 A | 8/1995 | Sadakata et al. | |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,606,695 A | 2/1997 | Dworzecki | |
| 5,611,050 A | 3/1997 | Theimer et al. | |
| 5,767,839 A * | 6/1998 | Rosenberg | A63F 13/06 345/156 |
| 5,812,069 A | 9/1998 | Albrecht et al. | |
| 5,812,865 A | 9/1998 | Theimer et al. | |
| 5,822,712 A | 10/1998 | Olsson | |
| 5,933,094 A | 8/1999 | Goss et al. | |
| 5,959,568 A | 9/1999 | Woolley | |

(Continued)

FOREIGN PATENT DOCUMENTS

| | | |
|---|---|---|
| WO | 9800787 A1 | 1/1998 |
| WO | 98/54682 A1 | 12/1998 |

(Continued)

OTHER PUBLICATIONS

U.S. Appl. No. 12/565,834, filed Sep. 24, 2009, Horvitz et al.

(Continued)

*Primary Examiner* — Tuan C. To
(74) *Attorney, Agent, or Firm* — Dave Ream; Tom Wong; Micky Minhas

(57) ABSTRACT

An information delivery system comprises a receiver component that receives information about the movement, velocity, acceleration, and/or locations over time of a user. A computation component using a predictive model generates a probability distribution relating to one or more of when the user will next be stopped, how long the user will be stopped, how long a pattern of motion, such as walking, driving in stop and go traffic, and smooth highway motion will last, based at least in part upon signals about motion over time. The system can further comprise an alerting component that determines when to provide the user with information based at least in part upon the probability distribution over some aspect of motion or cessation of motion, and optionally the content, or tagged or inferred urgency or importance, of a message or communication.

20 Claims, 16 Drawing Sheets

(56) References Cited

U.S. PATENT DOCUMENTS

| | | | |
|---|---|---|---|
| 5,987,374 A | 11/1999 | Akutsu et al. | |
| 5,987,377 A * | 11/1999 | Westerlage et al. | 701/454 |
| 6,047,260 A | 4/2000 | Levinson | |
| 6,100,819 A | 8/2000 | White | |
| 6,113,138 A * | 9/2000 | Hermann | B60R 21/0132 180/282 |
| 6,124,826 A | 9/2000 | Garthwaite et al. | |
| 6,219,694 B1 | 4/2001 | Lazaridis et al. | |
| 6,236,932 B1 | 5/2001 | Fastenrath | |
| 6,240,364 B1 | 5/2001 | Kerner et al. | |
| 6,249,215 B1 | 6/2001 | Dilz et al. | |
| 6,256,577 B1 | 7/2001 | Graunke | |
| 6,298,302 B2 | 10/2001 | Walgers et al. | |
| 6,314,365 B1 | 11/2001 | Smith | |
| 6,353,398 B1 | 3/2002 | Amin et al. | |
| 6,381,533 B1 | 4/2002 | Crane et al. | |
| 6,401,027 B1 | 6/2002 | Xu et al. | |
| 6,401,038 B2 | 6/2002 | Gia | |
| 6,445,968 B1 | 9/2002 | Jalla | |
| 6,466,232 B1 | 10/2002 | Newell et al. | |
| 6,480,783 B1 | 11/2002 | Myr | |
| 6,513,046 B1 | 1/2003 | Abbott, III et al. | |
| 6,539,302 B1 | 3/2003 | Bender et al. | |
| 6,549,915 B2 | 4/2003 | Abbott, III et al. | |
| 6,580,973 B2 * | 6/2003 | Leivian | B60R 16/0231 701/1 |
| 6,617,981 B2 | 9/2003 | Basinger | |
| 6,640,212 B1 | 10/2003 | Rosse | |
| 6,672,506 B2 | 1/2004 | Swartz et al. | |
| 6,721,650 B2 | 4/2004 | Fushiki et al. | |
| 6,741,188 B1 | 5/2004 | Miller et al. | |
| 6,744,383 B1 | 6/2004 | Alfred et al. | |
| 6,747,675 B1 | 6/2004 | Abbott et al. | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,813,558 B1 | 11/2004 | Lapstun et al. | |
| 6,828,909 B2 * | 12/2004 | Script | G08B 13/08 340/5.8 |
| 6,837,436 B2 | 1/2005 | Swartz et al. | |
| 6,842,877 B2 | 1/2005 | Robarts et al. | |
| 6,882,930 B2 | 4/2005 | Trayford et al. | |
| 6,909,380 B2 | 6/2005 | Brooke | |
| 6,970,131 B2 | 11/2005 | Percy et al. | |
| 6,977,581 B2 | 12/2005 | Dechamps | |
| 6,983,139 B2 | 1/2006 | Dowling et al. | |
| 6,985,810 B2 | 1/2006 | Moitra et al. | |
| 7,010,501 B1 | 3/2006 | Roslak et al. | |
| 7,040,541 B2 | 5/2006 | Swartz et al. | |
| 7,063,263 B2 | 6/2006 | Swartz et al. | |
| 7,171,378 B2 | 1/2007 | Petrovich et al. | |
| 7,195,157 B2 | 3/2007 | Swartz et al. | |
| 7,251,549 B2 | 7/2007 | Weed et al. | |
| 7,292,152 B2 * | 11/2007 | Torkkola et al. | 340/576 |
| 7,385,501 B2 | 6/2008 | Miller et al. | |
| 7,391,301 B2 | 6/2008 | Seike et al. | |
| 7,518,489 B2 | 4/2009 | Nelson et al. | |
| 7,631,028 B2 * | 12/2009 | Mathan | A61B 5/04004 708/322 |
| 7,643,834 B2 | 1/2010 | Ioppe et al. | |
| 7,821,421 B2 * | 10/2010 | Tamir et al. | 340/901 |
| 7,864,157 B1 * | 1/2011 | Wright | G06F 3/0346 345/158 |
| 8,014,936 B2 * | 9/2011 | Chapman et al. | 701/117 |
| 8,204,519 B2 | 6/2012 | Richardson et al. | |
| 8,270,949 B2 | 9/2012 | Gilbert | |
| 2001/0029425 A1 | 10/2001 | Myr | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0008637 A1 | 1/2002 | Lemelson et al. | |
| 2002/0010610 A1 | 1/2002 | Jacobs et al. | |
| 2002/0010615 A1 | 1/2002 | Jacobs | |
| 2002/0032689 A1 | 3/2002 | Abbott et al. | |
| 2002/0044152 A1 | 4/2002 | Abbott et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0103693 A1 | 8/2002 | Bayer et al. | |
| 2003/0016143 A1 | 1/2003 | Ghazarian | |
| 2003/0018521 A1 | 1/2003 | Kraft et al. | |
| 2003/0046158 A1 | 3/2003 | Kratky | |
| 2003/0046401 A1 | 3/2003 | Abbott et al. | |
| 2003/0065442 A1 | 4/2003 | Touney | |
| 2003/0095043 A1 | 5/2003 | Butzer et al. | |
| 2003/0136600 A1 | 7/2003 | Breed et al. | |
| 2003/0154476 A1 | 8/2003 | Abbott et al. | |
| 2003/0177008 A1 * | 9/2003 | Chang | G10L 17/26 704/255 |
| 2003/0182052 A1 | 9/2003 | Delorme et al. | |
| 2003/0201912 A1 | 10/2003 | Hashida et al. | |
| 2004/0059622 A1 | 3/2004 | Mueller | |
| 2004/0102893 A1 * | 5/2004 | Atkinson et al. | 701/117 |
| 2004/0176880 A1 | 9/2004 | Obradovich et al. | |
| 2004/0181495 A1 | 9/2004 | Grush | |
| 2004/0192351 A1 | 9/2004 | Duncan | |
| 2004/0201500 A1 | 10/2004 | Miller et al. | |
| 2004/0203713 A1 | 10/2004 | Strunk | |
| 2005/0004757 A1 | 1/2005 | Neeman et al. | |
| 2005/0026598 A1 | 2/2005 | Patel et al. | |
| 2005/0027444 A1 | 2/2005 | Kim | |
| 2005/0034078 A1 | 2/2005 | Abbott et al. | |
| 2005/0038596 A1 | 2/2005 | Yang et al. | |
| 2005/0049765 A1 | 3/2005 | Chetia et al. | |
| 2005/0157592 A1 * | 7/2005 | Nakamura | G04R 20/08 368/47 |
| 2005/0178202 A1 * | 8/2005 | Uehara | G01C 19/5607 73/497 |
| 2005/0201534 A1 | 9/2005 | Ignatin | |
| 2005/0234758 A1 | 10/2005 | Nishi | |
| 2005/0246142 A1 * | 11/2005 | Hammerschmidt | 702/189 |
| 2005/0256754 A1 | 11/2005 | Nastacio | |
| 2005/0266858 A1 | 12/2005 | Miller et al. | |
| 2005/0272442 A1 | 12/2005 | Miller et al. | |
| 2005/0288849 A1 | 12/2005 | Rothman et al. | |
| 2006/0019676 A1 | 1/2006 | Miller et al. | |
| 2006/0041379 A1 | 2/2006 | Brulle-drews | |
| 2006/0082472 A1 | 4/2006 | Adachi et al. | |
| 2006/0122846 A1 * | 6/2006 | Burr et al. | 705/1 |
| 2006/0234680 A1 | 10/2006 | Doulton | |
| 2006/0242434 A1 * | 10/2006 | Lee | G06F 1/1626 713/300 |
| 2007/0005246 A1 | 1/2007 | Kappi | |
| 2007/0182595 A1 | 8/2007 | Ghasabian | |
| 2007/0197195 A1 | 8/2007 | Sugiyama et al. | |
| 2007/0247360 A1 | 10/2007 | Hsu | |
| 2008/0010002 A1 | 1/2008 | Dekock et al. | |
| 2008/0090591 A1 | 4/2008 | Miller et al. | |
| 2008/0091537 A1 | 4/2008 | Miller et al. | |
| 2008/0161018 A1 | 7/2008 | Miller et al. | |

FOREIGN PATENT DOCUMENTS

| | | |
|---|---|---|
| WO | 01/63451 A2 | 8/2001 |
| WO | 01/93070 A2 | 12/2001 |
| WO | 2004021306 A2 | 3/2004 |
| WO | 2005/036471 A1 | 4/2005 |

OTHER PUBLICATIONS

U.S. Appl. No. 11/428,170, filed Jun. 30, 2006, Horvitz et al.

U.S. Appl. No. 10/729,464, filed Dec. 5, 2003, Horvitz et al.

(56) References Cited

OTHER PUBLICATIONS

U.S. Appl. No. 11/171,891, filed Jun. 29, 2005, Horvitz et al.
Losee, Jr., Robert M., "Minimizing Information Overload: The Ranking of Electronic Messages", In Journal of Information Science, vol. 15, Issue 3, Apr. 1989, pp. 179-189.
Non-Final Office Action in U.S. Appl. No. 11/428,170, Mailed Date: Aug. 22, 2007, Filed Date: Jun. 30, 2006, 9 Pages.
Non-Final Office Action in U.S. Appl. No. 11/428,170, Mailed Date: Feb. 13, 2008, Filed Date: Jun. 30, 2006, 10 Pages.
Final Office Action in U.S. Appl. No. 11/428,170, Mailed Date: Jul. 3, 2008, Filed Date: Jun. 30, 2006, 15 Pages.
Non-Final Office Action in U.S. Appl. No. 11/428,170, Mailed Date: Feb. 5, 2009, Filed Date: Jun. 30, 2006, 5 Pages.
Advisory Action in U.S. Appl. No. 11/428,170, Mailed Date: Sep. 10, 2008, Filed Date: Jun. 30, 2006, 3 Pages.
Notice of Allowance in U.S. Appl. No. 11/428,170, Mailed Date: Jul. 21, 2009, Filed Date: Jun. 30, 2006, 8 Pages.
Non-Final Office Action in U.S. Appl. No. 12/565,834, Mailed Date: Aug. 30, 2011, Filed Date: Sep. 24, 2009, 9 Pages.
Final Office Action in U.S. Appl. No. 12/565,834, Mailed Date: Feb. 2, 2012, Filed Date: Sep. 24, 2009, 13 Pages.
Non-Final Office Action in U.S. Appl. No. 12/565,834, Mailed Date: Oct. 15, 2012, Filed Date: Sep. 24, 2009, 9 Pages.
Non-Final Office Action in U.S. Appl. No. 12/565,834, Mailed Date: Apr. 26, 2013, Filed Date: Sep. 24, 2009, 6 Pages.
Notice of Allowance in U.S. Appl. No. 12/565,834, Mailed Date: Aug. 30, 2013, Filed Date: Sep. 24, 2009, 6 Pages.
Handley, et al., "Learning to Predict the Duration of an Automobile Trip", In Proceedings of the Fourth International Conference on Knowledge Discovery and Data Mining, Aug. 1998, pp. 1-5.
Fawcett, et al., "Adaptive Routing for Road Traffic", in IEEE Computer Graphics and Applications, vol. 20, Issue 3, May 2000, pp. 2-9.
Oda, et al., "Evaluation of Measured Travel Time Utilizing Two-way Communication in UTMS", In Vehicle Navigation and Information Systems Conference, vol. 7, Oct. 1996, 8 Pages.
Haigh, et al., "Exploiting Domain Geometry in Analogical Route Planning", In Journal of Experimental and Theoretical AI, vol. 9, Issue 4, Sep. 1997, 30 Pages.
Krumm, et al., "The Microsoft Multiperson Location Survey", In Microsoft Research TechReport, MSR-TR-2005-103, Aug. 2005, 4 Pages.
Rabiner, Lawrence R., "A Tutorial on Hidden Markov Models and Selected Applications in Speech Recognition", In Proceedings of the IEEE, vol. 77, Issue 2, Feb. 1989, pp. 257-286.
Microsoft Corporation, Auto Route, Retrieved on: Mar. 1, 2006, Available at: http://web.archive.org/web/20060411023817/http://www.microsoft.com/uk/homepc/autoroute/see/default.mspx, 1 page.
Take a Free Trip on Auto-Pilot, Retrieved on: Mar. 1, 2006, Available at: http://www.freetrip.com/, 2 pages.
Kurtz, et al., "Map Navigation Experiment", Published on: Feb. 3, 1998, Available at: http://www.itl.nist.gov/iaui/vvrg/nist-icv/experiments/mapnav/mapnav.html, 3 pages.
Edelkamp, et al., "Route Planning and Map Inference with Global Positioning Traces", In Computer Science in Perspective, Jan. 2003, 4 Pages.
Lam, et al., "Comparison of Two Non-Parametric Models for Daily Traffic Forecasting in Hong Kong", In Journal of Forecasting, Feb. 27, 2006, 2 Pages.
Bolla, et al., "A New Model for Network Traffic Forecast Based on User's Mobility in Cellular Networks with Highway Stretches", In International Journal of Communication Systems, vol. 17, Issue 10, Sep. 22, 2004, 2 Pages.
Barros, et al., "Activities as Behaviour Aspects", In Workshop on Aspectoriented Modelling, Sep. 2002, 6 Pages.
Meister, et al., "Generating Daily Activity Schedules for Households Using Genetic Algorithms", In 5th Swiss Transport Research Conference, Mar. 9, 2005, 26 Pages.

Doherty, et al., "The Development of a Unified Modeling Framework for the Household Activity-Travel Scheduling Process", In Traffic and Mobility: Simulation-Economics-Environment, Nov. 1999, pp. 35-56.
"Has ITS4mobility the Capability to Ensure Reliable Operation and Realistic Prediction of Vehicle Arrival and/or Departure Times?", Retrieved on: Mar. 2, 2006, Available at: http://web.archive.org/web/20051230173949/http://www2.volvo.com/mobilitysystems/global/en-gb/FAQ/RealisticPredictionsArrivals.htm, 1 page.
"TriMet Transit Tracker Implementation", In Innovations in Public Transit—Draft, Jan. 4, 2005, 7 Pages.
Ashbrook, et al., "Enabling Ad-Hoc Collaboration Through Schedule Learning and Prediction", In Workshop on Mobile Ad Hoc Collaboration, Apr. 2002, 4 Pages.
Ostergren, et al., "Road Talk: A Roadside Location-Dependent Audio Message System for Car Drivers", In Journal of Mobile Multimedia, vol. 1, Issue 1, Feb. 25, 2005, pp. 47-61.
Schwartz, Joseph, "Microsoft Releases MapPoint 2002", In Directions Magazine, Apr. 24, 2001, 4 pages.
Franzese, et al. "Traffic Simulation Application to Plan Real-Time Distribution Routes", In Proceedings of the Winter Simulation Conference, vol. 2, Dec. 2002, pp. 1214-1218.
Smith, et al., "Meeting Real-Time Traffic Flow Forecasting Requirements with Imprecise Computations", In Computer-Aided Civil and Infrastructure Engineering, vol. 18, No. 3, May 2003, 2 Pages.
"Fastcommute", Retrieved on: Mar. 1, 2006, Available at: http://web.archive.org/web/20051206072030/http://home.earthlink.net/~fastcommute/, 3 pages.
Harter, et al., "A Distributed Location System for the Active Office", In IEEE Network, Jan. 1994, pp. 62-70.
Chen, et al., "A Survey of Context-Aware Mobile Computing Research", In Dartmouth Computer Science Technical Report TR2000-381, Nov. 2000, pp. 1-16.
Schilt, William Noah, "A System Architecture for Context-Aware Mobile Computing", A Doctoral Dissertation, Columbia University, Dec. 1995, 153 Pages.
Spreitzer, et al., "Providing Location Information in a Ubiquitous Computing Environment", In Proceedings of the Fourteenth ACM Symposium on Operating Systems Principles, Dec. 1993, pp. 270-283.
Theimer, et al., "Operating System Issues for PDAs", In Fourth Workshop on Workstation Operating Systems, Oct. 1993, pp. 2-8.
Want, et al., "Active Badges and Personal Interactive Computing Objects", In IEEE Transactions on Consumer Electronics, vol. 38, Issue 1, Feb. 1992, pp. 10-20.
Schilit, et al., "The ParcTab Mobile Computing System", In Proceedings of the Fourth Workshop on Workstation Operating Systems, Oct. 1993, 4 Pages.
Schilit, et al., "Context-Aware Computing Applications", In Proceedings of the First Workshop on Mobile Computing Systems and Applications, Dec. 1994, pp. 85-90.
Schilit, et al., "Customizing Mobile Applications", In Proceedings of USENIX Symposium on Mobile and Location Independent Computing, Aug. 1993, 9 Pages.
Spreitzer, et al., "Architectural Considerations for Scalable, Secure, Mobile Computing with Location Information", In Proceedings of the 14th International Conference on Distributed Computing Systems, Jun. 1994, pp. 29-38.
Spreitzer et al., "Scalable, Secure, Mobile Computing with Location Information", In Communications of the ACM, vol. 36, Issue 7, Jul. 1993, 27 pages.
Want, et al., "The Active Badge Location System", In ACM Transactions on Information Systems, vol. 10, Issue 1, Jan. 1992, pp. 91-102.
Weiser, Mark, "Some Computer Science Issues in Ubiquitous Computing", In Communications of the ACM, vol. 36, Issue 7, Jul. 1993, pp. 75-84.
Billinghurst, et al., "An Evaluation of Wearable Information Spaces", In Proceedings of the IEEE Virtual Reality Annual International Symposium, Mar. 1998, 8 Pages.
Rhodes, et al., "Remembrance Agent: A Continuously Running Automated Information Retrieval System", In Proceedings of the

(56) References Cited

OTHER PUBLICATIONS

First International Conference on the Practical Application of Intelligent Agents and Multi Agent Technology, Apr. 1996, pp. 487-495.
Horvitz, et al., "In Pursuit of Effective Handsfree Decision Support: Coupling Bayesian Inference, Speech Understanding, and User Models", In Nineteenth Annual Symposium on Computer Applications in Medical Care, Toward Cost-Effective Clinical Computing, 1995, 8 pages.
Rhodes, Bradley J., "The Wearable Remembrance Agent: A System for Augmented Memory", In Proceedings of the First International Symposium on Wearable Computers, Oct. 1997, pp. 123-128.
Horvitz, et al., "Attention-Sensitive Alerting in Computing Systems", In Microsoft Research, Aug. 1999, 26 Pages.
Schilit, et al., "Disseminating Active Map Information to Mobile Hosts", In IEEE Network, vol. 8, Issue 5, Sep. 1994, 23 Pages.
Billinghurst, et al., "Wearable Devices: New Ways to Manage Information", In IEEE Computer Society, vol. 32, Issue 1, Jan. 1999, pp. 57-64.
Starner, Thad Eugene, "Wearable Computing and Contextual Awareness", A Doctoral Dissertation, Massachusetts Institute of Technology, Jun. 1999, 248 Pages.
Rhodes, Bradley J., "The Wearable Remembrance Agent: A System for Augmented Memory", In Personal Technologies Journal, Special Issue on Wearable Computing, 1997, 12 Pages.
"Schedule and Breakout Session Information, Workshop on Wearable Computing Systems", Available at <<http://wearcam.org/computing/workshop/schedule.html>>, Aug. 19-21, 1996, 3 Pages.
Billinghurst, Mark, "Research Directions in Wearable Computing", University of Washington, May 1998, 48 Pages.
Weiser, Mark, "The Computer for the 21st Century", In Scientific American, Sep. 1991, 8 Pages.
Joachims, Thorsten, "Text Categorization with Support Vector Machines: Learning with Many Relevant Features", In 10th European Conference on Machine Learning, Apr. 21, 1998, pp. 137-142.
International Search Report Issued in PCT Patent Application No. PCT/US00/20685, Mailed Date: Sep. 29, 2003, 3 Pages.

\* cited by examiner

COMPUTING AND HARNESSING INFERENCES ABOUT THE TIMING, DURATION, AND NATURE OF MOTION AND CESSATION OF MOTION WITH APPLICATIONS TO MOBILE COMPUTING AND COMMUNICATIONS

REFERENCE TO RELATED APPLICATIONS

This application is a division of U.S. application Ser. No. 12/565,834, filed Sep. 24, 2009, entitled COMPUTING AND HARNESSING INFERENCES ABOUT THE TIMING, DURATION, AND NATURE OF MOTION AND CESSATION OF MOTION WITH APPLICATIONS TO MOBILE COMPUTING AND COMMUNICATIONS, which is a continuation of U.S. application Ser. No. 11/428,170, filed Jun. 30, 2006, entitled COMPUTING AND HARNESSING INFERENCES ABOUT THE TIMING, DURATION, AND NATURE OF MOTION AND CESSATION OF MOTION WITH APPLICATIONS TO MOBILE COMPUTING AND COMMUNICATIONS, which are both incorporated herein by reference in their entireties.

BACKGROUND

Computers and computer-related technology have enabled users to instantaneously communicate with one another. For example, a single user may be associated with a portable phone, multiple email accounts, a pager, a personal digital assistant, an instant messaging device, and the like. Some of these technologies can be combined. For instance, today's cellular telephones can include email applications, wherein emails can be received at the cellular telephone shortly after an email is delivered to the email account. Similarly, text messaging can be employed over most portable telephones. Still further, some of today's automobiles are associated with phone applications. Pursuant to an example, automobiles can be associated with a microphone and speakers, such that when the automobile's phone number is dialed a radio can be disabled and a ring tone can be provided through the speakers. It can thus be discerned that today individuals associated with sufficient computing equipment can be contacted at almost any time in most regions (including while traveling).

Furthermore, technology has enabled multimedia to be delivered to portable devices, such as streaming video (which can be for entertainment purposes or advertisement purposes), streaming audio, etc. For instance, several of today's automobiles are equipped with monitors that enable users therein to watch videos (e.g., DVDs), review maps of an area, receive feeds from one or more broadcasting locations (through use of antennas), etc. Still further, vehicles can be altered to facilitate housing of video game applications, such that passengers within an automobile can be entertained throughout a journey.

There are instances, however, where it may not be desirable to enable a user to be contacted. For example, when traveling on a busy freeway during times of high traffic congestion, the user may not wish to be interrupted, as probabilities of an accident occurring are increased. Similarly, an advertiser would not wish to provide an advertisement to a user when the user is not likely to pay any attention to the advertisement. There is currently no effective manner, however, for determining a time that a user is most likely to wish to receive an alert during travel. For instance, route planning applications are static in that regardless of a context they output a same route, and provide no indication of where along the route a good point would be to receive a message.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates generally to prediction of when a user will be available to review information and when they are busy and provision of information should be deferred. More particularly, a user in traffic can be associated with one or more sensors that enables the user's position to be determined within a traffic system, speed and/or velocity of the user, direction of travel, and the like. Based upon the sensed data, a real-time inference can be made regarding how long the user will remain stopped (if sensed data indicates that the user was already stopped), when the user will become stopped for a threshold amount of time, and the like. For instance, probabilistic distributions can be created over an amount of time that the user will remain stopped, over when the user will be stopped for a certain amount of time, etc.

These real-time inferences can then be leveraged in connection with determining when to provide information to the user. For instance, today people can be contacted through a plurality of devices in several different message formats. It may not be desirable to provide the user with information, however, when the user is traveling in a high-congestion traffic region. Furthermore, it may not be desirable to provide the user with a voice message that requires time to review the message that is longer than time that the user will be stopped. Accordingly, information can be prioritized and provided to the user based at least in part upon real-time inferences relating to probabilities that the user will be available to receive and review the information.

The probability distributions can be generated through analysis of information at some level of detail about a traffic system and flow of vehicles through a traffic system, for example. It is understood, however, that the novel concepts described herein are applicable generally to any system or process that is subject to stoppage, such as machine operation, drive through lanes, lines in amusement parks, and the like. Additionally, a traffic-system representation need not be analyzed, because a probability distribution over length of a current stop, when a stop of a certain length will occur, and durations of different phases of driving, e.g., how long until stop and go driving will continue before smooth highway driving begins, and the like, can be determined without use of a detailed traffic system representation. Instead, data about values and patterns of accelerations, maintained velocities, decelerations, and cessations of motion, in addition to contextual information and demographic data can be employed in building predictive models about the timing and duration of motion cessation, or motion and motion pattern (e.g., continuing to drive in stop and go traffic). Continuing with the traffic example, a plurality of automobiles can be associated with sensors that enable one to determine one or more of an automobile's location, acceleration, velocity, travel direction, time of day, day of week, weather conditions, and/or the like. Thus, the system representation can accurately represent flow of traffic given different contexts, such as time of day and day of week. The system representation can further include data relating to location of stop signs, stop lights, and other static entities within the traffic system. Therefore, once data associated with a user in the system is received, such as their current location in the traffic system, the representation can be analyzed in light of the received data to aid in generating the aforementioned probability distributions. Again, however, use of the system representation, and even location information, is optional—however, adding a consideration to a database that relates the timing, duration, and overall patterns of motion and the cessation motion to details drawn from a representation of a traffic system may lead to increases in the accuracy of the output of probability distributions over stops, future stops, and over the timing and duration of other patterns of motion, such as the duration of a driver remaining in stop and go traffic.

To aid in determining when and/or whether to provide information to the user, a cost/benefit analysis can be undertaken with respect to cost of disrupting the user versus cost of withholding the information from the user given determined probability distributions of when and how long the user will be stopped. These costs can be based at least in part upon user preferences. For instance, the user may wish to receive phone calls from her spouse immediately regardless of whether she is moving in traffic or stopped. In another example, the user may wish to receive phone calls while moving if they are wearing their headset, and if not wearing their headset they may wish to have an artificial operator hold the call until a stop is sensed or a threshold amount of time has passed.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
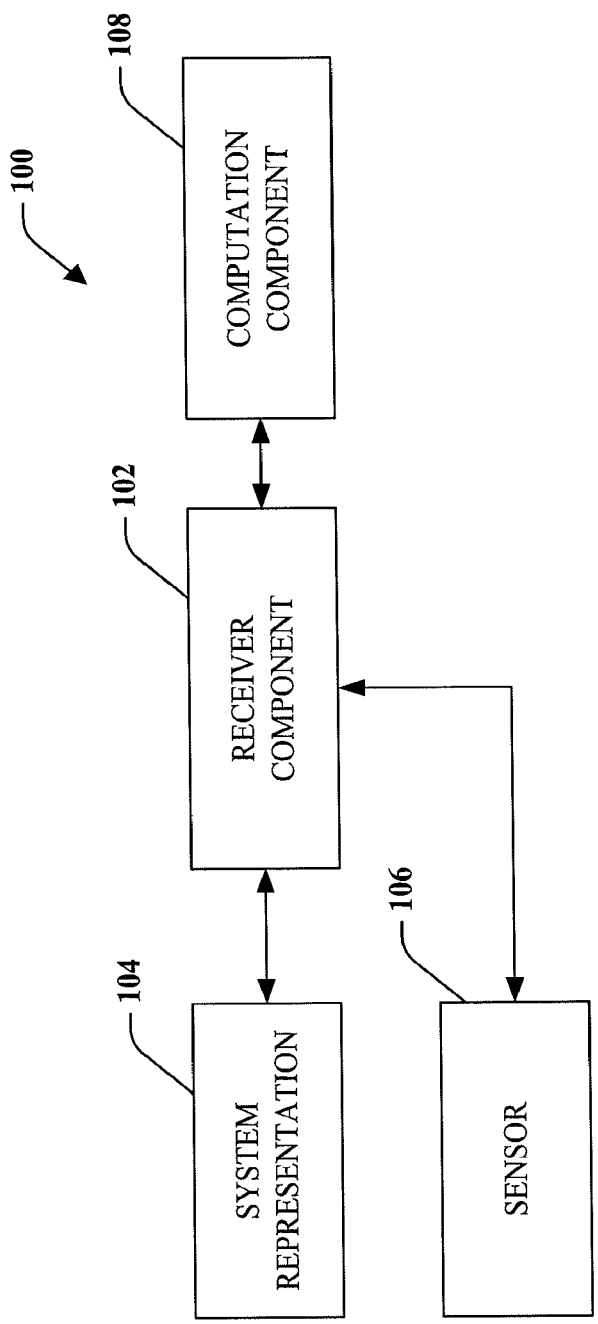
FIG. 1 is a high-level block diagram of a system that facilitates determination of probability distributions relating to a user stopping within a traffic system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

For purposes of explanation and not limitation, the systems/methods are generally described herein with respect to users traveling in a traffic system (e.g., in automobiles). It is to be understood and appreciated, however, that concepts underlying the following description of the figures can be applied to other areas where an activity is subject to at least temporary stoppage (e.g., machine breakdown).

Referring now to FIG. 1, a system 100 that facilitates predicting when a user will cease an activity and an amount of time that such activity will be ceased is illustrated. The system 100 includes a receiver component 102 that receives a system representation 104 and data from one or more sensors 106. For example, the system representation 104 can be based upon a traffic system, where parameters of the traffic system are learned through analysis of vehicles traveling through the system. The system representation 104 can additionally include data relating to location of stop lights, stop signs, intersections, on and off ramps for freeways, etc. Users traveling through the traffic system can be associated with sensing devices such as accelerometers, GPS (or other motion detection or location-based identification scheme, such as wireless triangulation), and data from such sensors can be placed within a data repository (not shown) to create a robust case library. The case library can additionally include contextual data associated with location/velocity/acceleration data, including time of day, day of week, whether an event had occurred in a nearby region (such as a sporting event and/or a concert), weather conditions, and any other suitable contextual data. In another example, the system representation 104 can be on a smaller scale, such as based solely upon a driver's activity. For instance, the system representation 104 can represent a driver's history of travel, past and recent accelerations, velocities, decelerations, locations, and/or the like.

Instances within the case library where users were not moving can be located, and typical durations of such pauses can be discerned given certain particular contextual data. For example, at a particular stop sign users may typically be stopped for just a few seconds, while at a stop light a typical user may be stopped for over a minute. Machine learning can be undertaken upon the case library to refine the system representation 104, such that given data associated with a user (such as current location, current speed, context, etc.) a good sense for when a user will be stopped and for an amount of time of the stop can be ascertained.

The system 100 additionally includes a computation component 108 that reviews the system representation 104 in light of received data from the sensor 106. If the sensor 106 outputs data that indicates that the user is at a stop, the computation component 108 can calculate a probability distribution over duration of a stop. For instance, the computation component 108 can analyze the user's location during a stop in connection with the system representation 104 and generate a probability distribution over the duration of the stop. In another example, if the sensor 106 indicates that the user is moving, then the computation component 108 can generate a probability distribution over time until the user is stopped (or time until the users stops for a time longer than a threshold time) and/or a probability distribution regarding when a user will leave stop and go traffic and enter smooth highway driving. For instance, location of stop signs in the system representation 104 compared to location of the user can be indicative of whether the user is in stop and go traffic or stopping at one or more stop signs. In still another example, the computation component 108 can receive a user's current velocity and determine a probability distribution regarding when the user will be stopped for over a threshold amount of time.

With still more detail with respect to the computation component 108 determining probability distributions over stops, the component 108 can analyze month of year, season, whether a day is a holiday, weather conditions, road conditions, major events (such as sporting and/or cultural events), sensed traffic patterns (e.g., which may be sensed by a fixed sensing system, sensors from drivers, . . . ), dynamics of traffic flow (e.g., durations of time since particular regions of a traffic system have been reported to be blocked or freed from blockage), reports on any road of blockage or flow, natural language reports of accidents, events, closures, construction, etc., whether a major road has been blocked within a certain radius or road driving distance to a user, distance to a major road that has become blocked, distance to a road that has become blocked within some threshold time, road segments that are part of a bypass, conduit, or alternative routes (to arterial), within some distance or in a radius from a current, recent, or evolving arterial traffic flow problem. Such contextual information can be utilized in connection with determining probability distributions over one or more stops.

Road types can include, for example, whether the road is a highway, a major road, an arterial road, a street, a ramp, a limited access highway, a ferry connection, etc. Other parameters that can be taken into account include posted speed, number of lanes, two way versus one way, public versus private, toll versus free, paved versus unpaved, physical divider between different directions or not, length of segment, incoming valence (number of streets coalescing into this road), outgoing valence (number of streets the segment branches into), intersections per mile, traffic lights and their density, whether a road segment is part of a typical "trouble spot" (e.g., where traffic jams often occur), flow of traffic at a segment having high variance versus low variance, etc.

Other factors can additionally be contemplated by the computation component 108 (which may be retained within the system representation 104), such as proximal terrain surrounding a particular road segment, services nearby a road segment, whether a road segment is near transportation services, travel stops, automotive services, accommodations, shopping, ATMs, banks, emergency assistance centers, city centers, government facilities, educational facilities, business facilities, restaurants, grocery stores, restaurants, bars/nightclubs, recreational facilities, parks, and/or the like. Still further, the computation component 108 can contemplate relationships between roads, such as geographic proximity to a road, distance from arterial system, distance to a highway on or off-ramp, whether a road a "conduit" to or from highway (e.g., a major road that can reach the highway or come from the highway by traversing a distance of less than a threshold), whether a road part of one or more "bypass" routes around a major road or arterial, whether a road is part of paths in side streets that route around arterial trouble spots (commonly blocked portion of arterial system), whether a road is part of one or more "alternate" routes (e.g., the road is a part of at least one path that serves as an alternate route to blocked highways), etc.

Still further, the computation component 108 can reason over recent and long-term history of maintained velocities (received from the sensors 106), such as maximum and minimum velocities since a most recent stop, maximum and minim velocities over a threshold period of time, recent and long term history of acceleration and deceleration, recent and long-term history of stops (time since last stop, duration of the stop, number of stops over a certain period of time, last long stop, last short stop, etc.), pattern and velocity of a current stop, an amount of time surpassed at a current stop, etc. Still further, when a stop has occurred, an amount of time that the stop has already lasted can be used as an additional variable by the computation component 108 to predict remaining duration of the stop. These and other suitable factors can be determined to have an affect on when a user will stop, length of a stop, remaining time of a stop, and the like.

Figure 2:
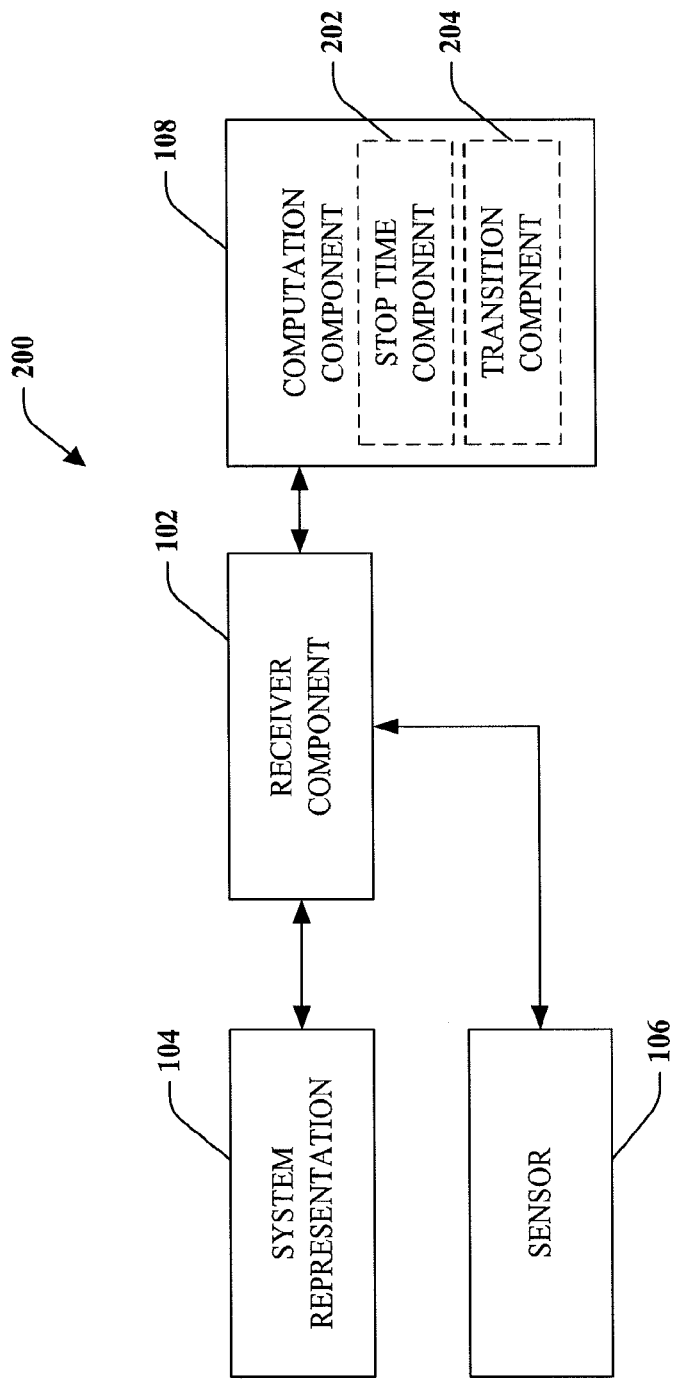
FIG. 2 is a block diagram of a system that facilitates determining a probabilistic distribution relating to how long a user will remain stopped if already stopped.

Now turning to FIG. 2, a system 200 that facilitates generating probability distributions with respect to stopping is illustrated. The system 200 includes the receiver component 102 that receives data from the sensor 106 that is associated with a user. The sensed data can then be provided to the computation component 108 that accesses the system representation 104 upon receipt of the sensed data. The computation component 108 can include a stop time component 202 that is activated if sensed data provided from the sensor 106 indicates that the user has ceased moving. Once activated, the stop time component 202 can predict a probability distribution over duration of the stop. For example, in same or similar locations (where similarity can be explicitly defined or inferred through utilization of machine learning) different users may have been stopped certain amounts of time. The stop time component 202 can generate the probability distribution based at least in part upon such previous instances of users in that region, which can be represented within the system representation 104. However, remaining duration of the stop can also be determined by the stop time component 202 based upon recent history of stops, accelerations, decelerations, and/or velocities through use of an accelerometer that may be within a mobile computing device (e.g., a mobile phone). Thus, the system representation 104 can simply be a collection of recent user activity and need not be a robust representation of an entire traffic system, for instance.

The computation component 108 can also include a transition component 204 that is activated if the receiver component 102 receives data from the sensor 106 that indicates that the user is traveling in the system, beginning an activity, etc. Once such indication is received, the transition component 204 can predict a probability distribution over a time until a next stop. Additionally or alternatively, the transition component 204 can predict a probability distribution over a time until a next stop with mean longer than time t will occur. Still further, the transition component 204 can predict a probability distribution over a time until the user transitions between driving patterns, such as between stop and go driving and smooth highway driving and can further and predict the duration of time that the user will be in a particular traffic pattern (e.g., stop and go traffic and/or smooth highway driving). Such determination can be based upon a case library that is reasoned over, the system representation 104, and data from the sensor 106.

Figure 3:
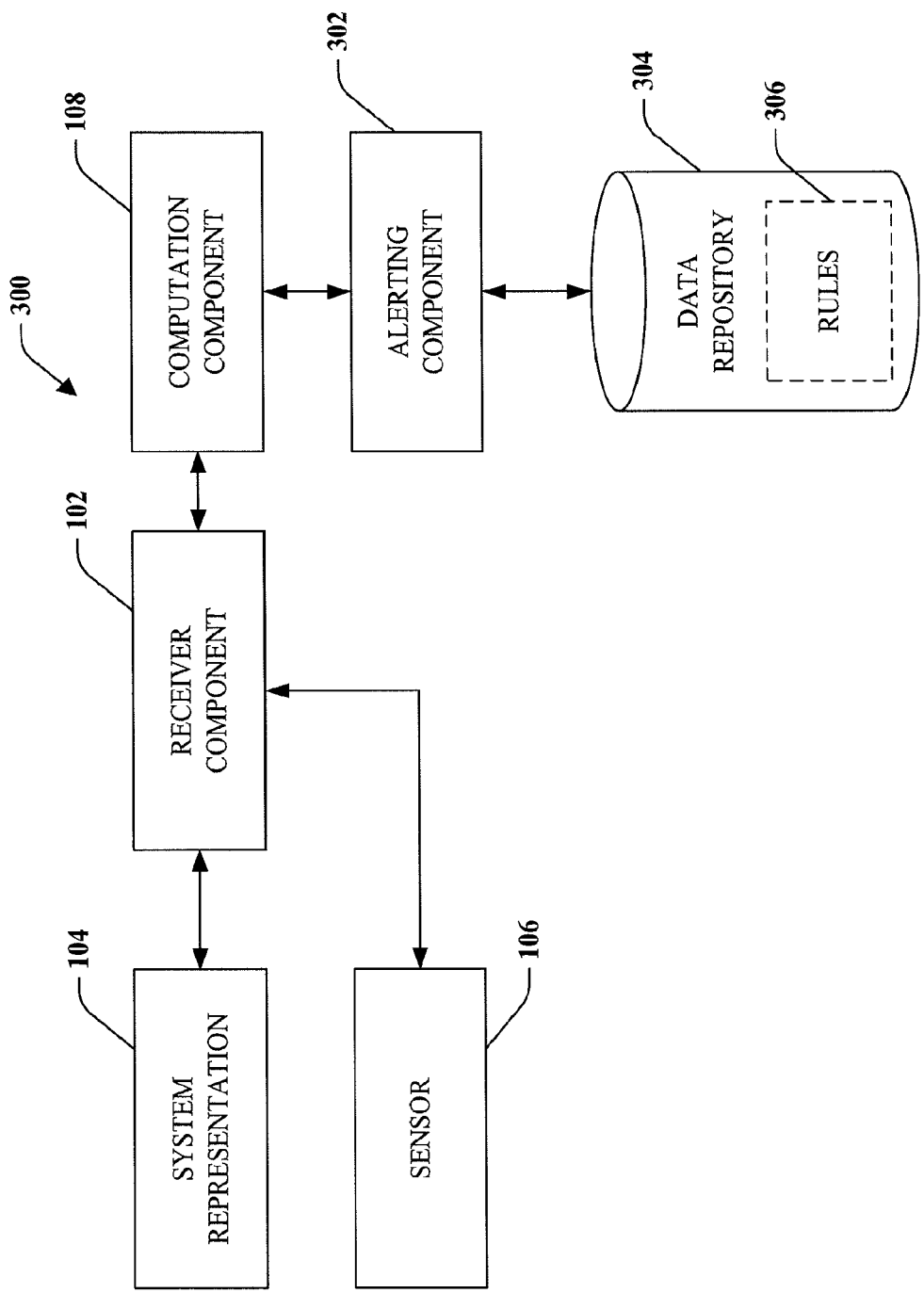
FIG. 3 illustrates a system for alerting a user based at least in part upon real-time inferences relating to a user's availability.

Referring now to FIG. 3, an alerting system 300 that leverages real-time inferences relating to when and how long a user will be stopped to determine when and how to provide information, alerts, and/or messages to a user is illustrated. The system 300 includes the receiver component 102 that receives data from a sensor, wherein such data can indicate a user's location, a user's current velocity, a user's acceleration, and/or the like. Further, time of day, day of week, and other contextual data can be received from the sensor 106 and/or associated with sensed data (e.g., by way of a time stamp or analyzing current temporal data). The computation component 108 can then analyze the system representation 104 in light of the received sensed data and generate probabilistic inferences relating to when a user will most likely be subject to a stop, an amount of time of the expected stop, an expected time that a stop will exceed a certain amount of time, an expected amount of time the user will remain stopped if already stopped, and the like. As described above, these probabilistic inferences can be generated through utilization of the system representation 104, which can be built based at least in part upon a case library of sensed data associated with a traffic system. As stated above, however, it is understood that the system representation 104 can be utilized to infer stop times in connection with any activity or process that is subject to stoppages, such as lines in an amusement park, machinery, and the like.

Furthermore, as used herein, the term "inference" refers generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Thus, as described above, given data relating to a user and/or system, the computation component 108 can output probabilistic inferences relating to when a user will stop, how long they will be stopped, when they will be stopped for a threshold period of time, when they will no longer be subject to stopping, etc.

The system 300 can additionally include an alerting component 302 that leverages off of the probabilistic inferences to provide a user with messages, alerts, and/or other suitable information at times when the user's attention is not needed elsewhere (e.g., driving a motor vehicle in moving traffic). For instance, the alerting component 302 can determine when to provide the user with information or alters based at least in part upon a probability distribution over some aspect of motion or cessation of motion, and optionally the content (or tagged or inferred urgency or importance) of a message or communication. In other words, the alerting component 302 can identify opportunities for providing a user with a voice message, text message, advertising data, email messages, and the like. The alerting component 302 can additionally analyze content of the message, source of the message, device that the message is directed towards (if any), parameters of the message such as priority, sender of the message, time the message was initially sent, etc. in connection with determining whether/when to provide a message or other suitable information to the user.

The alerting component 302 can access a data repository 304 that includes one or more rules 306, and can utilize such rules in connection with determining when to provide a user with a message, alert, advertisement etc. For instance, one example rule can call for phone calls from the user's spouse to be provided to the user immediately regardless of the user's status in a traffic system (e.g., stopped, moving, . . . ). Another example rule can call for holding a voice message from the user until the computation component 108 predicts that the user will be stopped for an amount of time that enables the user to review an entirety of the message. The rules 306 within the data repository 304 and decisions made by the alerting component 302 (if a situation arises not dictated by a rule) accord to preferences of users, and consider notions as an amount of time available for a user to consume information as well as cognitive ability given historical data and user state. For example, if the system predicts that a user in a car will be stopped for sixty seconds, the alerting component 302 can coordinate delivery of a streaming video that lasts less than sixty seconds. Upon sensing movement, the streaming can be stopped.

Furthermore, if the user is associated with a plurality of desirably received messages, such messages can be prioritized and/or provided to the user based at least in part upon probability inferences regarding stopping times of the user. For example, a text message that may take a few seconds to read and a voice message that may take a minute to review can be received at a mobile phone and retained until the user has an ability to review such messages. The voice message may be associated with a higher priority than the text message—however, the computation component 108 can predict that given the user's current state and/or the current state of the system, the user will not likely be stopping for a sufficient amount of time to review an entirety of the message for ten minutes. The alerting component 302 can analyze the situation and determine whether it is more important to interrupt the user while driving and/or provide the user with a part of the voice message during an upcoming predicted stop or current stop (even though the stop is not predicted to last for the duration of the message).

Figure 4:
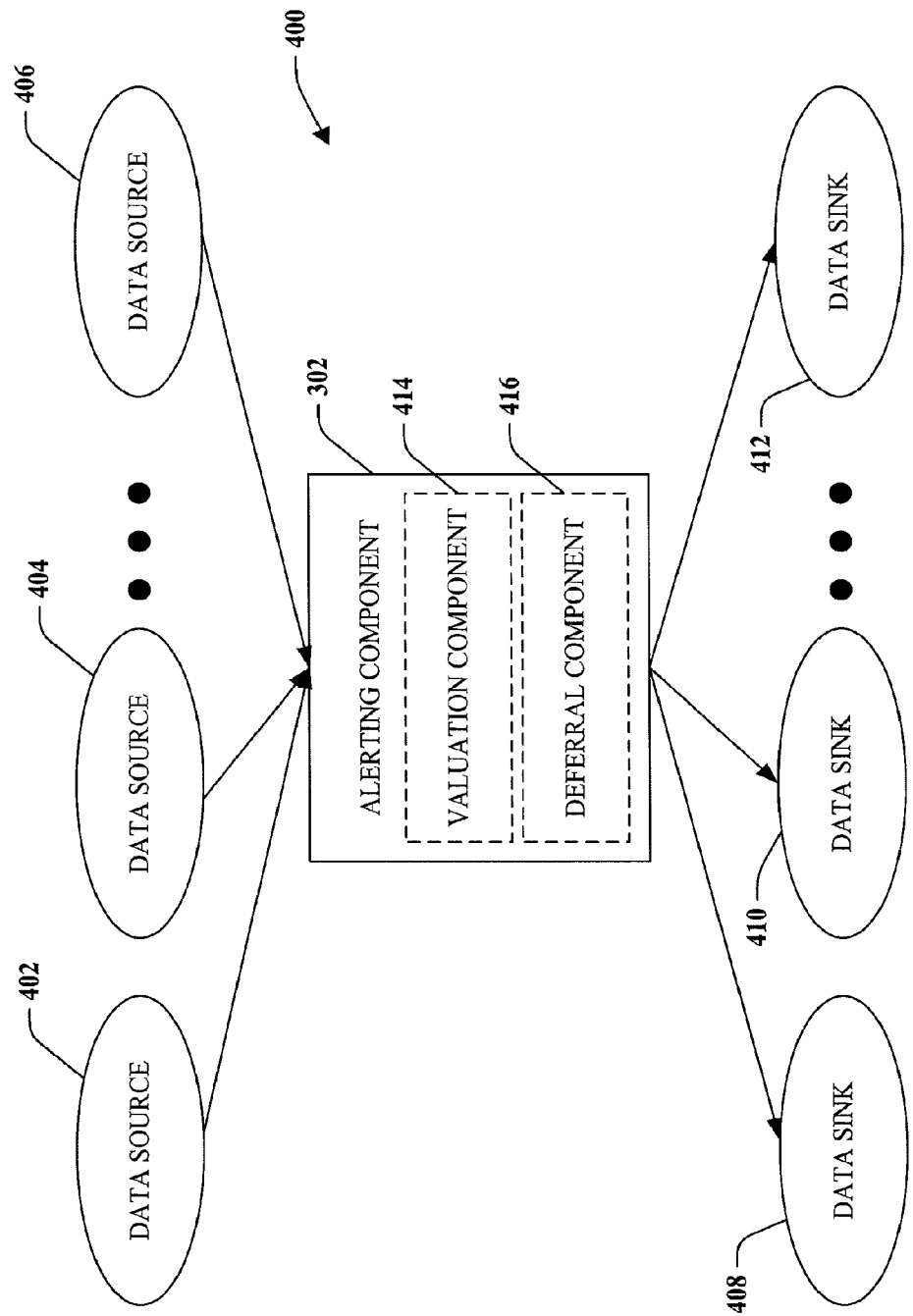
FIG. 4 illustrates a component that can be utilized to provide information to multiple data sinks.

Referring now to FIG. 4, a more detailed illustration of the alerting component 302 in operation is illustrated. The alerting component 302 can be privy to communications, alerts, and the like from a plurality of data sources 402-406. For example, the data source 402 can be an email application of an associate of the user, the data source 404 can be a cellular telephone of a friend of the user, the data source 406 can be an advertisement server that selectively provides advertisements to the user. Thus, the data sources 402-406 can be any suitable device/system that is utilized in connection with delivering information to a user (such as alerts, messages, advertisements, streaming video, etc.). The alerting component 302 can act as a centralized operator with respect to the data sources 402-406, such that any information that reaches the user is first analyzed by the alerting component 302. The alerting component 302 can be resident within a server (not shown) that services data sinks 408-412 of the user, wherein the data sinks 408-412 can include a portable telephone, a laptop computer, a personal digital assistant, a pager, an instant messaging device, a graphical display and associated speakers in an automobile, an onboard computer, an onboard television, etc. Additionally or alternatively, the alerting component 302 and/or at least a portion of functionality associated therewith can be embedded within one or more of the data sinks 408-412. For example, the alerting component 302 can be resident within a portable telephone, wherein the alerting component 302 can hold calls, text messages, notifications (such as notifications of stock prices, notifications of existence of voicemail, etc.) with respect to the portable telephone. If the alerting component 302 is resident within one or more clients or is distributed across clients, the components or portions thereof can communicate between themselves and/or act autonomously.

The alerting component 302 can include a valuation component 414 that can determine and/or assign a value associated with a message from an incoming data source as well as a cost with respect to the user not receiving the message as time proceeds. The valuation component 414 can make such determination based upon several rules and/or make inferences given known user preferences. For example, the user of the portable phone can provide a rule to the alerting component that assigns a high value to a phone call from her spouse. The valuation component 414 can further assign values and/or costs based at least in part upon user context and/or current system state. For example, if a user is close to home, the valuation component 414 can downgrade the value of a text message from her spouse, as the user will most likely be able to converse with the spouse in person in a few minutes.

The alerting component 302 can additionally include a deferral component 416 that takes into consideration probabilities associated with a user being in a stopped position and duration of the stop. Thus, the deferral component 404 can weigh the value of the message versus the cost of deferring the message given probabilities output by the computation component 108 (FIGS. 1-3), which are indicative of a user's cognitive abilities (e.g., the user's cognitive abilities will increase when they are not moving). The deferral component 416 can also utilize predefined rules to determine when and how to provide information to a user and/or infer when and how to alert a user given knowledge of available data sinks. For instance, the user can define a rule that states that the user is only to be alerted with information with a particular priority where the user is predicted to be stopped (or mostly stopped) for at least thirty seconds. In another example, the deferral component 416 can defer messages until a stop that is predicted to be above thirty seconds with a threshold probability occurs or until the message has been deferred for five minutes, whatever occurs earlier.

In summary, the alerting component 302 receives probability distributions relating to a current or future stop, wherein the probability distributions can relate to a length of time of a current stop, when a next stop of a certain time will occur, and/or when the user will transition into or out of stop and go traffic. The alerting component 302 can then leverage that real-time inference to identify opportunities for alerting a user. In particular, the alerting component 302 can discern with a particular probability whether the user will have time to read an email, receive a phone call that is being held by an artificial operator, etc. More formally, the alerting component 302 can include a function by which timing of notifications are guided based at least in part upon nature of contents of a message, including the source and priority associated therewith, a probability regarding the time a user will be stopped for a particular period of time, and a probability that it will be the particular period of time. Data sources to aid in determining stopping probabilities or attentiveness of the user can be exotic. For instance, whether the user depresses a brake pad gently or firmly can be indicative of their attentiveness and/or their probability of stopping. Further, contents of the user's calendar can indicate which messages are of utmost importance to the user.

Figure 5:
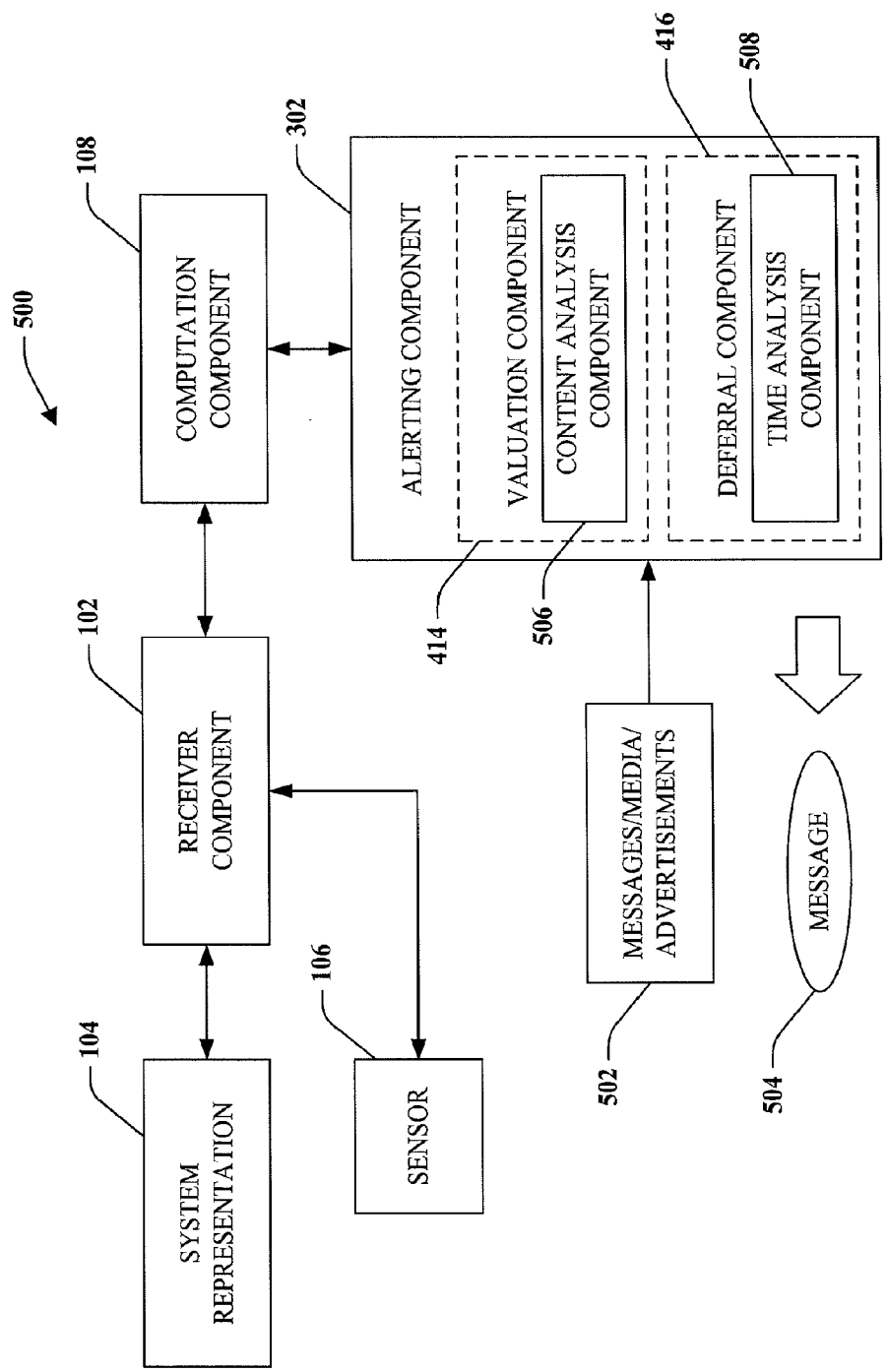
FIG. 5 is a block diagram of a notification system.

Referring now to FIG. 5, a system 500 that facilitates selective delivery of multimedia to one or more devices associated with a user and/or automobile is illustrated. The system 500 includes the receiver component 102 that receives sensed data associated with a user (from the sensor 106). In an example, the sensor 106 can sense stability and/or changing of radio signals (e.g., cell tower signals, WiFi signals, . . . ), which can be indicative of whether the user is moving or not moving. The computation component 108 can analyze the system representation 104 and, given the data from the sensor 106, can predict probabilities relating to how long a current stop will continue, how long it will be until a stop occurs, how long a future stop will last, etc. The system 500 can additionally include the alerting component 302, which can receive messages 502, which may include text, voice, and/or email messages, multimedia such as streaming audio and/or video, advertisements, and the like. The alerting component can output a message 504 to the user based at least in part upon content of the message and parameters associated therewith.

The alerting component 502 can include the valuation component 414 that in turn comprises a content analysis component 506, wherein the content analysis component 506 scans messages desirably provided to the user to aid in determining an importance of such messages. For instance, the content analysis component 506 can include voice recognition functionality that can analyze spoken words left in a voice message to determine urgency thereof. The content analysis component 506 can additionally analyze voice inflections and tones in connection with inferring urgency of the message. Still further, the content analysis component 506 can review language within text messages (including email messages) to determine an amount of urgency associated therewith. The deferral component 416 can include a time analysis component 508 that determines an amount of time required to entirely review the received messages 502. For instance, a time of a voice mail can be determined. A time to read an email can be estimated based at least in part upon length of the email. If the messages 502 include an advertisement, length of the advertisement can be discerned.

The alerting component 302 can then select when and how to output the message 504 based at least in part upon the probabilities generated by the computation component 108, the analysis undertaken by the analysis component 506, and the time required to review received messages as determined by the time analysis component 508. Pursuant to one example, the computation component 108 can determine that there is a high probability that the user will be associated with a stop in three minutes and that the stop will last forty seconds. The content analysis component 506 can analyze an email and determine that it is associated with high priority and that there is text within the email indicating that a timely response is required. The time analysis component 508 can determine that it will take approximately twenty seconds to read the email. The alerting component 302 can thus decide that, rather than alerting the user immediately and interrupting the user's driving experience, the message 504 can be provided in three minutes. If the stop does not occur as expected, the alerting component 302 can provide the user with the message after, for example, five minutes.

Figure 6:
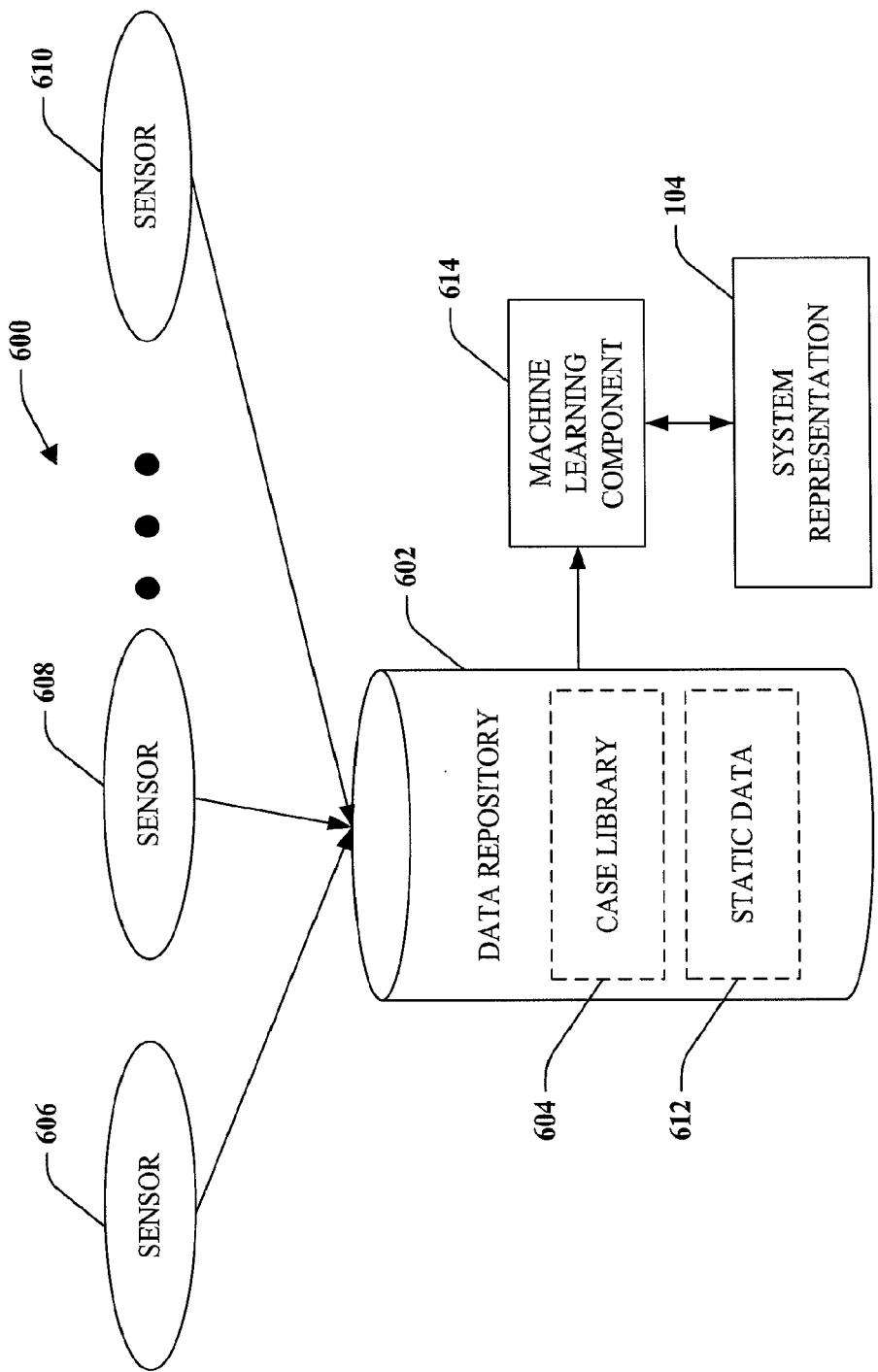
FIG. 6 is a block diagram of a system that facilitates building a traffic system representation that can be utilized to determine probability distributions relating to user stops within a traffic system.

Turning now to FIG. 6, a system 600 that can be employed in connection with building/defining the system representation 104 is illustrated. The system 600 includes a data repository 602 that retains sensed data with respect to a plurality of users, resulting in creation of a case library 604. The sensed data can be received from one or more sensors 606-610 that are associated with users in a traffic system. For instance, the sensors 606-610 can include location sensors, such as GPS receivers, accelerometers, speedometers, sensors indicating traffic flow in one or more regions, sensors associated with brakes of an automobile, or any other suitable sensors. These sensors can be associated with a plurality of users over time, enabling the case library 604 to be a robust representation of traffic flows in a traffic system as context varies (e.g., time of day, day of week, weather conditions, . . . ). As described above, the sensors 606-610 can be employed in other contexts, such as monitoring machine operation for breakdowns, etc.

The data repository 602 can additionally include static data 612 associated with the traffic system, such as location of stop signs, stop lights, road types (e.g., two lane road, four lane road), posted speed limits, terrain associated with road segments, and other suitable data that is associated with traffic systems that is not subject to change. The static data 612 and data from within the case library 604 when taken together can provide an accurate representation of traffic flows in a traffic system. The system 600 can additionally include a machine-learning component 614 that reasons over contents of the case library 604 as well as the static data 612 to create an accurate and robust system representation, wherein probability distributions relating to time and duration of stops can be determined.

In more detail, the machine learning component 614 can analyze contents of the data repository 602 to build or train models that can reside within the system representation 104 that are then employed to determine probability distributions over stop times given current user/system data (as well as a deferral time for messages and other interrupts). For instance, the models can learn patterns relating to traffic flows and cause such patterns to be represented within the system representation 104. The models can include substantially any type of system such as statistical/mathematical models and processes for modeling traffic flow including the use of Bayesian learning, which can generate Bayesian dependency models, such as Bayesian networks, naïve Bayesian classifiers, and/or Support Vector Machines (SVMs), for example. Other type models or systems can include neural networks and Hidden Markov Models, for example. Although elaborate reasoning models can be employed in accordance with the claimed subject matter, it is to be appreciated that other approaches can also utilized. For example, rather than a more thorough probabilistic approach, deterministic assumptions can also be employed. Thus, in addition to enabling the computation component 108 (not shown) to perform reasoning under uncertainty, logical decisions can also be made regarding user status, location, context, etc.

The machine learning component 614 can also be employed in connection with filling in "gaps" within the system representation. For instance, even if several users are associated with sensors and monitored within a traffic system, there may be certain portions of the traffic system that are not associated with sensed data. The machine learning component 614 can analyze existing data to aid in representing traffic flows at portions of the traffic system not associated with sensed data over varying contexts. This can be done through recognition and analysis of similar roads at similar contexts, analyzing sensed speeds with respect to a road segment at different contexts, etc. Therefore, in summary, the machine learning component 614 can be employed to create a robust representation of a traffic system, thereby enabling the computation component 108 to determine probabilities relating to stopping within the traffic system.

Referring now to FIGS. 7-10, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
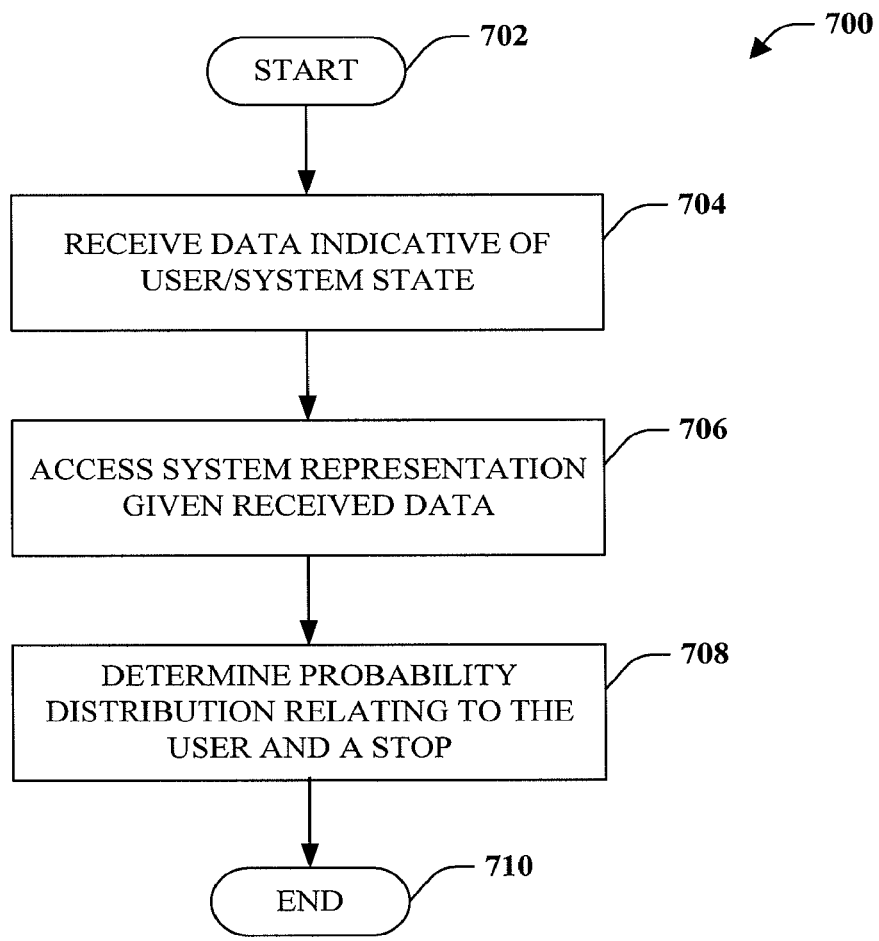
FIG. 7 is a representative flow diagram of a methodology for determining probability distributions relating to stops within a traffic system.

Referring specifically to FIG. 7, a methodology 700 for determining probability distributions relating to a stop is determined. The methodology 700 starts at 702, and at 704 data is received that is indicative of a state of a user and/or system. For instance, the data can be indicative of a user's current location within a traffic system and current time, current velocity of the user, current acceleration, and/or other suitable data relating to the user. Data relating to the system can include weather conditions, traffic flows in other regions, whether a sporting event is being undertaken within the traffic system, etc. Various information sources can be employed in connection with generating the received data, including accelerometers, GPS receivers, Internet sites, radio stations, television stations, speedometers, amongst others.

At 706, a system representation is accessed/analyzed given the received data. For instance, a robust system representation can include road segments and intersections within a traffic system, location of stop signs and stop lights, historic traffic data that is averaged over time, sensed traffic data with respect to different contexts, and the like. At 708, a probability distribution relating to the user and an upcoming or current stop is determined/predicted. For example, if sensed data indicates that the user is not moving in a certain location, the system representation can be analyzed with respect to such location (and context, including time) to determine a probability distribution relating to an amount of time the user will remain stopped. Thus, for instance, it can be determined that there is an eighty percent probability that the user will be stopped for at least thirty seconds. This real-time inference can then be leveraged (as described above) to provide users with messages and/or other information, wherein the provision of information is based at least in part upon priority information associated with messages (such as expected value of information to the user, loss of value as time passes, cost associated with delaying the message for a particular period of time).

In another example, probability distributions can be determined with respect to when a next stop of at least a threshold amount of time t will occur. This can be inferred in real-time as sensed data with respect to a user and/or a system is received. The real-time inference can then be leveraged to determine, for instance, whether to provide a user with information immediately or wait until the user is most likely to be stopped. Thereafter, if the user actually does not stop, the information can be presented to the user after a threshold amount of time has passed. The methodology 700 then completes at 710.

Figure 8:
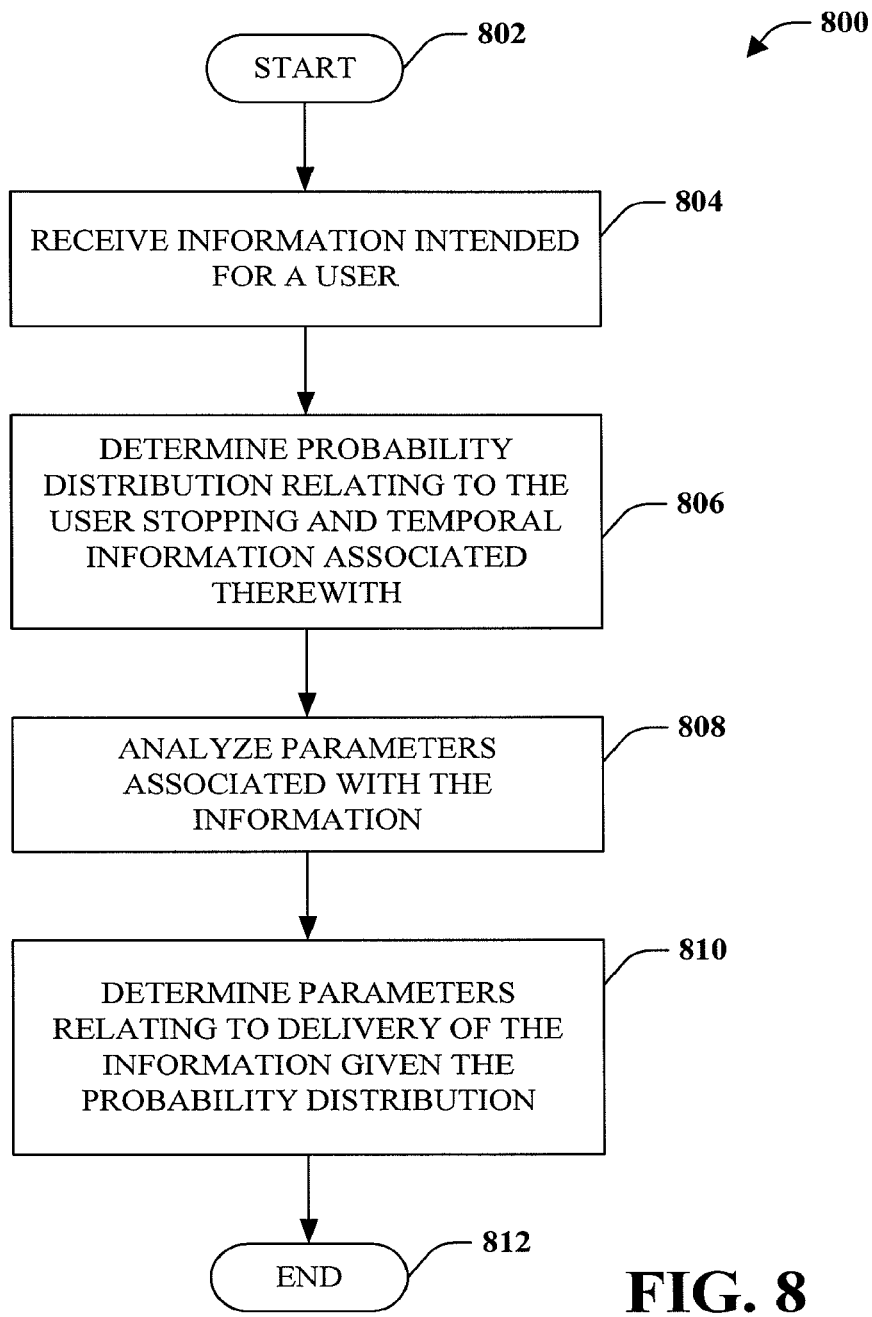
FIG. 8 is a representative flow diagram of a methodology for determining when and how to provide information to a user.

Turning now to FIG. 8, a methodology 800 for determining when/how to deliver information to a user in light of probability distributions relating to a user's opportunity to review the information is illustrated. The methodology 800 starts at 802, and at 804 information intended for the user is received. This information can include text messages, instant messages, voice messages, pages, emails, alerts, reminders, advertisements, entertainment media, and any other suitable information. Further, the information can be received at a server prior to arriving at a client device. Alternatively, a client device can receive the information and hold such information until it is subject to analysis.

At 806, a probability distribution relating to a user stopping and temporal information associated with such stop is determined. Pursuant to an example, a sensor associated with the user can indicate that they are moving a particular direction on a road segment at a certain velocity. Based at least in part upon such information, a probability distribution relating to when the user will be stopped and probable length of such stop can be determined. At 808, parameters associated with the received information are analyzed, including whether it is associated with high priority, amount of time required to review the information, type of information (email, voice message, etc.), an amount of user attention required by the message (e.g., an advertisement may require little of the user's attention), and the like.

At 810 parameters relating to delivery of the information are determined given the inferred probability distribution and the analysis of the parameters. The determination can include to which device the information should be delivered, time that the information should be delivered, mode of delivery of the information, and the like. This determination can be based upon, for instance, user preferences that are embodied as rules; for instance, a user may wish to receive messages of high priority from her spouse regardless of driving status, and may further wish to receive such messages on her portable telephone. Another rule may be to hold all messages from a particular individual until it is sensed that the user is stopped and there is an eighty percent probability that the user will remain stopped for thirty seconds or longer. The information can then be delivered according to the determined parameters. The methodology 800 then completes at 812.

Figure 9:
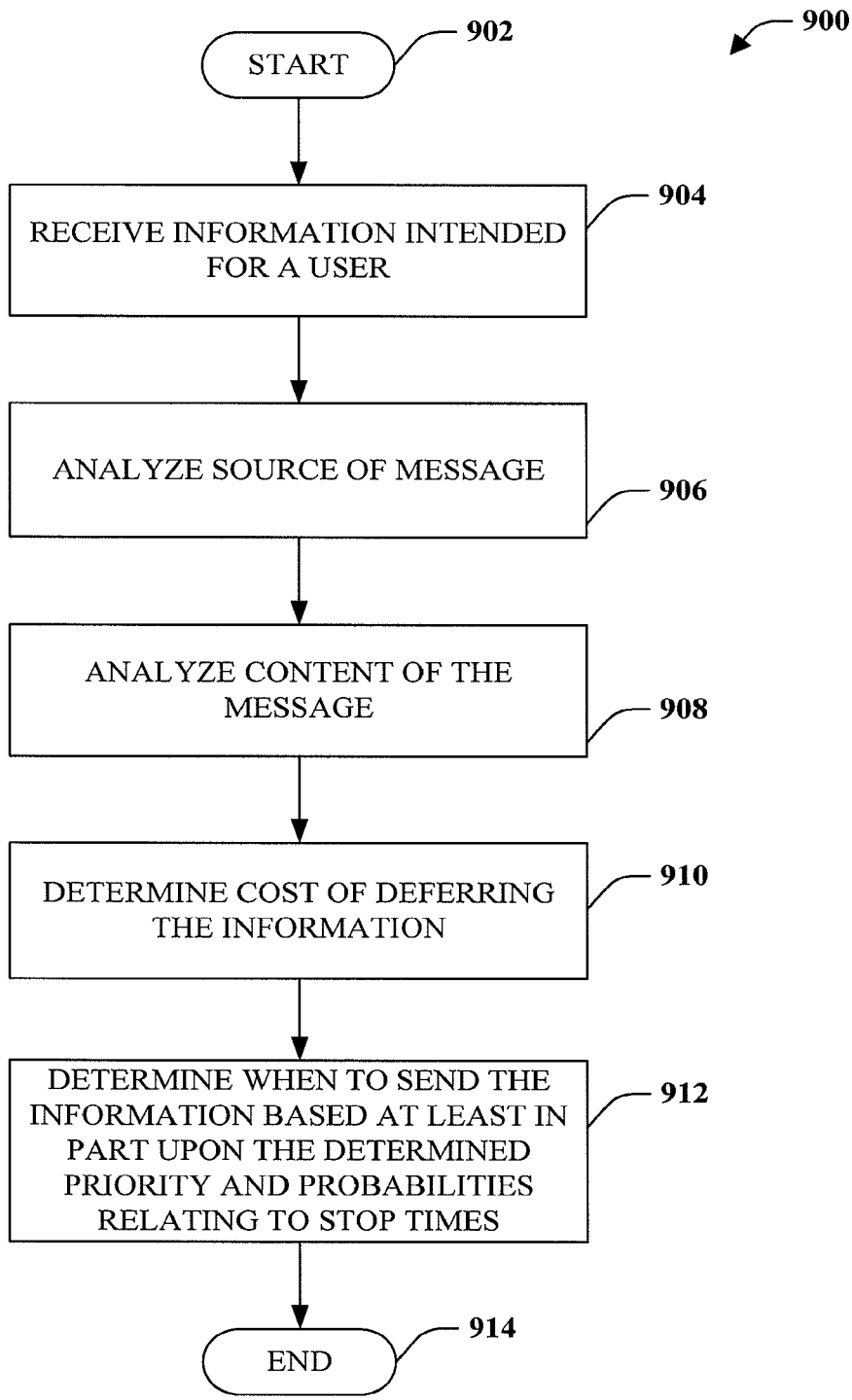
FIG. 9 is a representative flow diagram of a methodology for determining when to provide information to a user based at least in part upon costs of deferring the information.

Referring now to FIG. 9, a methodology 900 for determining when/whether to send information to a user based at least in part upon probability distributions relating to a user stopping is illustrated. The methodology 900 starts at 902, and at 904 information intended for a user is received, where the information can be a text message, voice message, email message, reminder, alert, advertisement, and the like. As described above, the received information can come from one of a plurality of different sources, including mobile phones, email servers, alert services, etc. At 906, source of the information is analyzed, including deliverer of the information and geographical origin of the information. For instance, a user may have preferences relating to a deliverer of the information (e.g., always assign high priorities to a particular deliverer of information).

At 908, the content of the message is analyzed. For instance, text can be analyzed, voice messages can be analyzed with voice recognition techniques, emails can be scanned to look for particular keywords in a subject line, and the like. At 910, cost associated with deferring the information is determined. In one example, priority can be determined based upon a cost assigned to the information if the information is not provided to the user. Thus, cost of delaying deliverance of the information can be balanced against cost of interrupting the user given the user's current state in order to determine a deferral policy with respect to the information specifically, and the user generally. For example, a context-sensitive probability distribution over the user's transition from moving to being stopped can be generated. A measure of loss can also be determined with respect to delaying the incoming information.

At 912, based upon the probable cost, a determination is made regarding when to provide the user with the information based at least in part upon the determined cost and the determined probabilities relating to stop times (which are based at least in part upon current sensed data relating to the user/system). For instance, the determination can be made to wait to deliver the information for at least five minutes, as there is a high probability that the user will be stopped in traffic for three minutes in less than five minutes. The methodology 900 then completes at 914.

Figure 10:
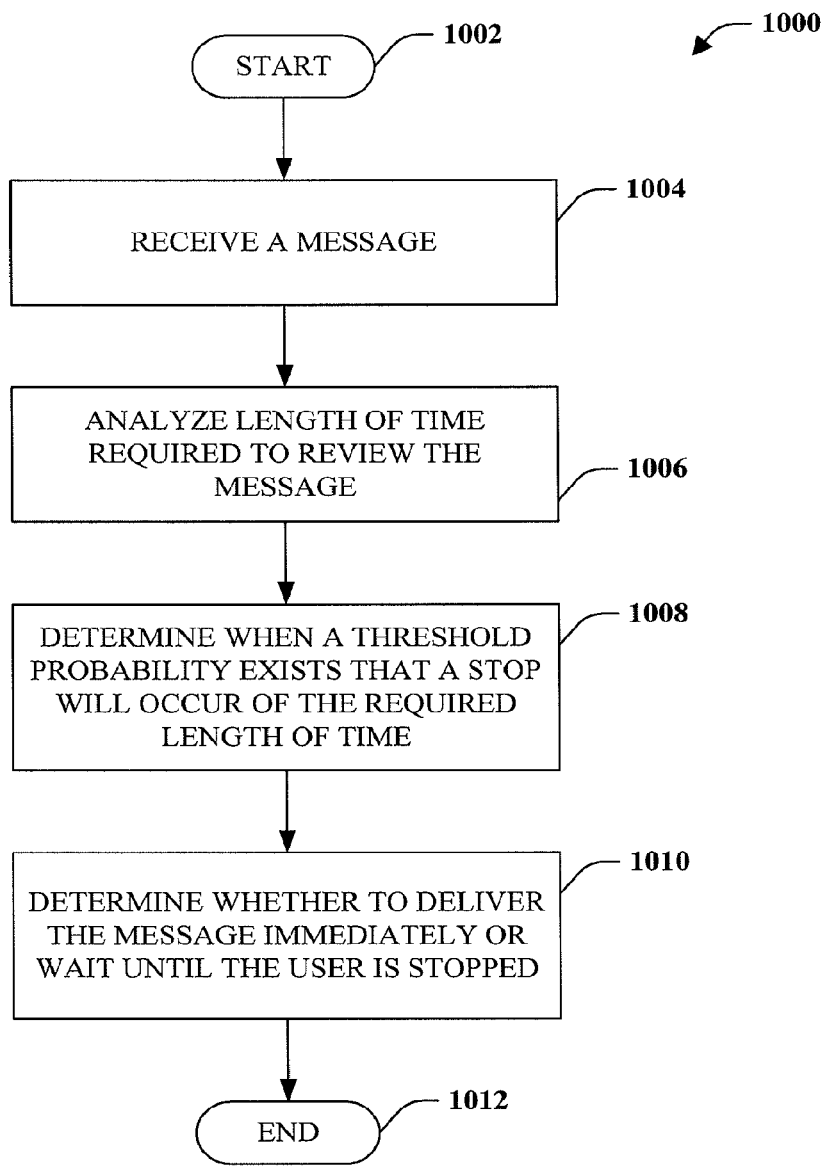
FIG. 10 is a representative flow diagram of a methodology for determining whether to immediately provide information to a user or defer the information until the user is stopped.

Turning now to FIG. 10, a methodology for determining whether to deliver information to a user immediately or wait until the user is stopped is illustrated. The methodology 1000 starts at 1002, and at 1004 a message is received (such as an email message). At 1006, an amount of time required to review the message is determined. For instance, if the message is a voice message, the length in time of the voice message can be determined. If the message is an email, a number of words can be counted within the email and then translated to an amount of time required to read the counted words.

At 1008, a time that a stop will occur with a threshold probability of the stop being over the amount of time required to review the message is determined. This determination can be made by analyzing a robust traffic system representation that indicates traffic flows given particular contextual data and current sensed data associated with the user or system, including time of day and day of week. At 1010, a determination is made regarding whether to deliver the message immediately or to wait a period of time given the probability that the user will become stopped. For instance, a cost of delaying the message can be weighed against a cost of interrupting the user while driving. The methodology 1000 then completes at 1012.

Figure 11:
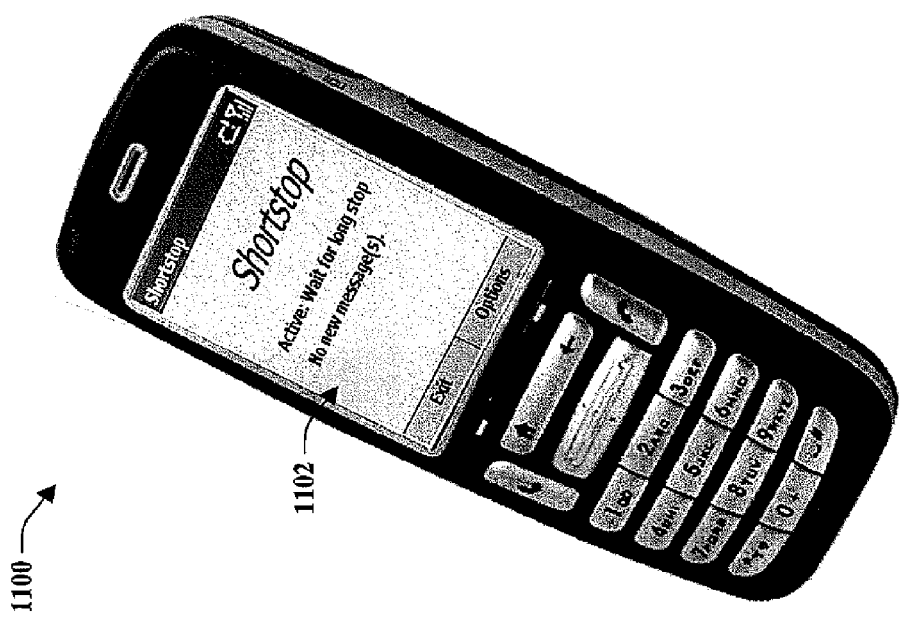
FIG. 11 is an example mobile phone.

Now referring to FIG. 11, an example mobile telephone 1100 that can provide information to a user is illustrated. The mobile telephone 1100 can include, for example, an accelerometer, a GPS sensor, a speedometer, and/or the like. The mobile telephone 1100 can also be analyzed in connection with performing triangulation, monitoring signal strength (e.g., WiFi), and/or the like. The mobile telephone 1100 also includes a screen 1102 that can display textual information to a user. As described above, information can be provided to a user given sensing of a stop, prediction of a stop at a particular instance in time, predicted duration of a stop, predicted time until a stop, etc. Information can be provided to the user based upon a set of predefined rules, inferences relating to importance of the message, and/or the like.

Figure 12:
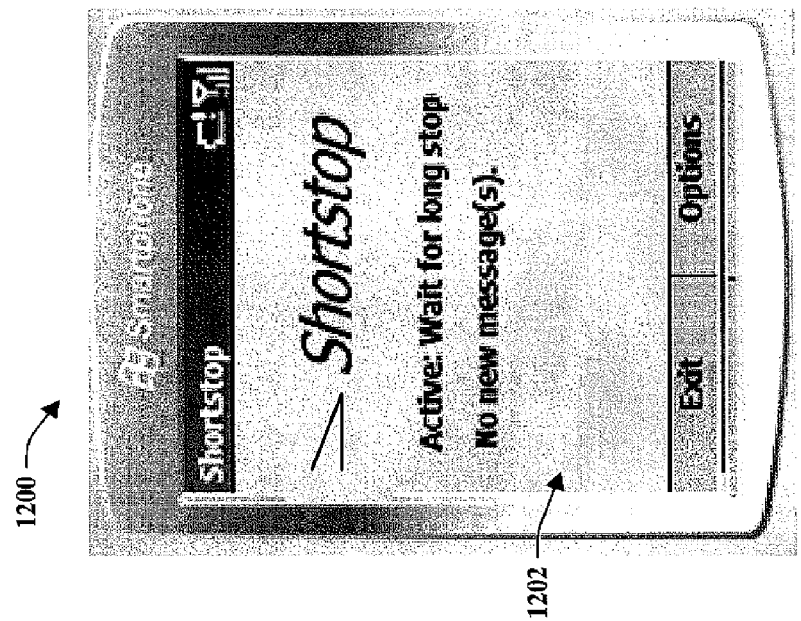
FIGS. 12-15 illustrate example interfaces that can be provided to a user.

Now referring collectively to FIGS. 12-15, an example mobile telephone 1200 is provided to illustrate user interfaces that can be employed in connection with the functionality described herein. Referring solely to FIG. 12, the mobile telephone 1200 is illustrated as displaying a user interface 1202 that indicates that there are no new messages and that messages are to be withheld from a user until a long stop. The user interface 1202 additionally displays an exit button (to exit an application) and an options button, wherein the user can change how/when information is provided to such user. Now turning to FIG. 13, the mobile telephone 1200 is illustrated as displaying a graphical user interface 1302 where the user can select an amount of time to withhold messages. For example, the interface 1302 enables the user to set a rule such that the user will not be interrupted for a certain amount of time, while the user is in a certain location, while the user is moving, etc.

Figure 14:
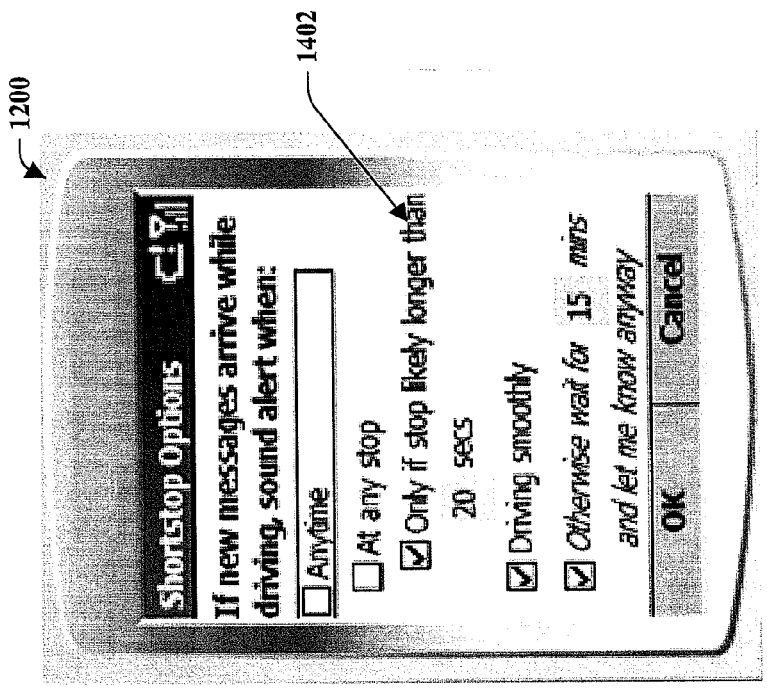
Figure 13:
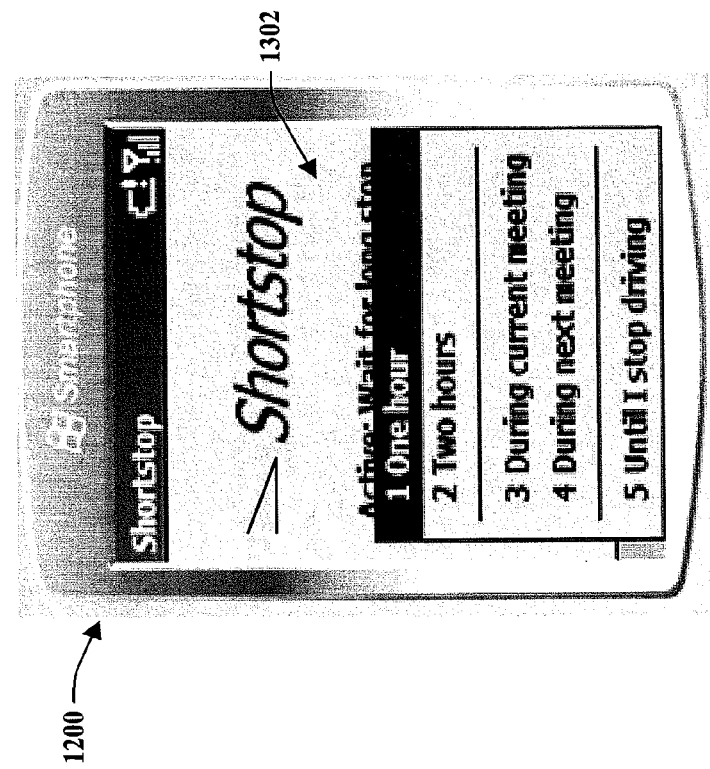
Figure 15:
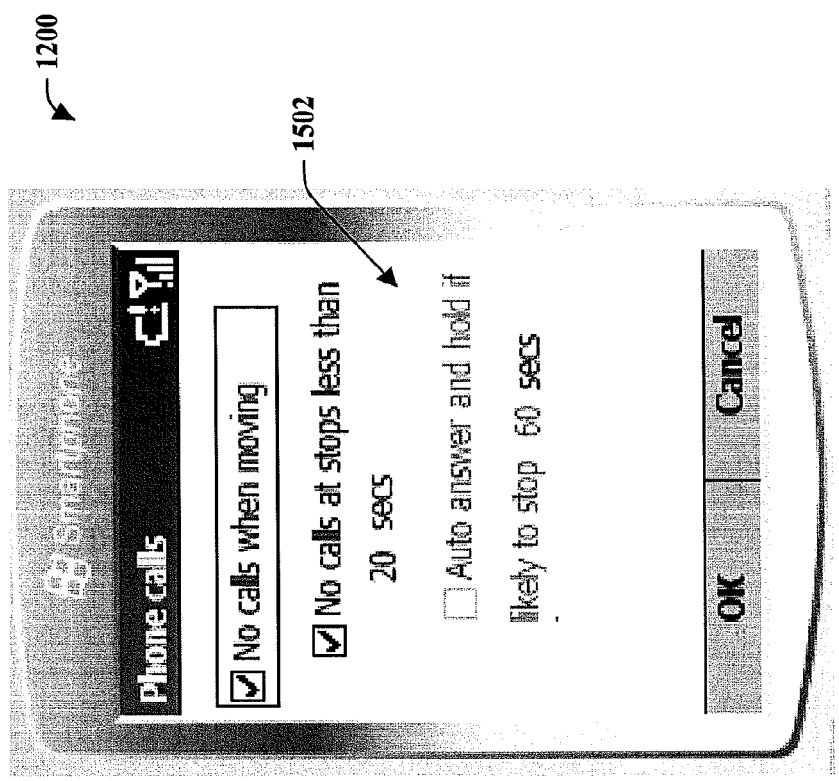

Turning now to FIG. 14, the mobile telephone 1200 is displaying a user interface 1402 that enables a user to select options relating to when information is provided to such user with respect to when a stop is occurring or predicted to occur. As can be discerned from reviewing the user interface 1200, the user can select parameters relating to how long a stop should be when providing messages to such user. The user can also set a deferral time, such that messages are provided if they are deferred beyond a certain amount of time. These parameters can be altered by the user "on the fly", can be set to change as context changes (e.g., as time changes, as sensed location alters, . . . ). With reference to FIG. 15, the mobile telephone 1200 is illustrated as displaying a user interface 1502 that allows a user to inform the mobile phone that calls should be held while the user is moving and that calls should be delivered only if the user will be stopped for over 20 seconds.

Figure 16:
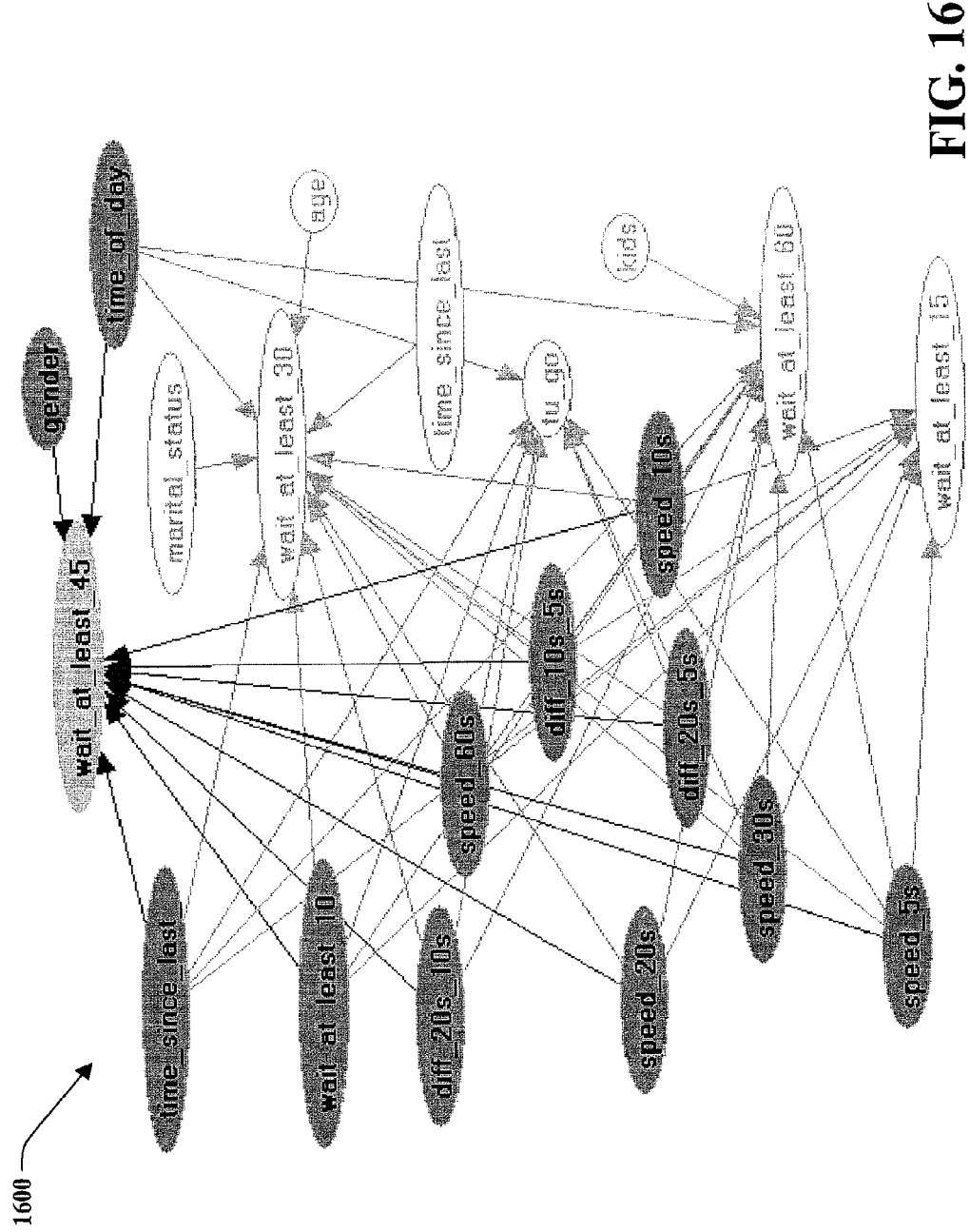
FIG. 16 is an example predictive model.

Turning now to FIG. 16, an example predictive model 1600 that can be utilized in connection with determining length of a stop and when a stop will occur is illustrated. For instance, variables can be sensed, such as velocities of travel at particular instances in time (e.g., 60 seconds in the past, 30 seconds in the past, . . . ), difference in velocity at different times, gender of the driver, marital status of the driver, whether the driver has children, current traffic conditions, proximity to stop lights, etc. Such variables can be utilized by the model to determine a probability that the user will be stopped for at least forty five seconds (or will stop for a certain period of time in forty five seconds).

Figure 17:
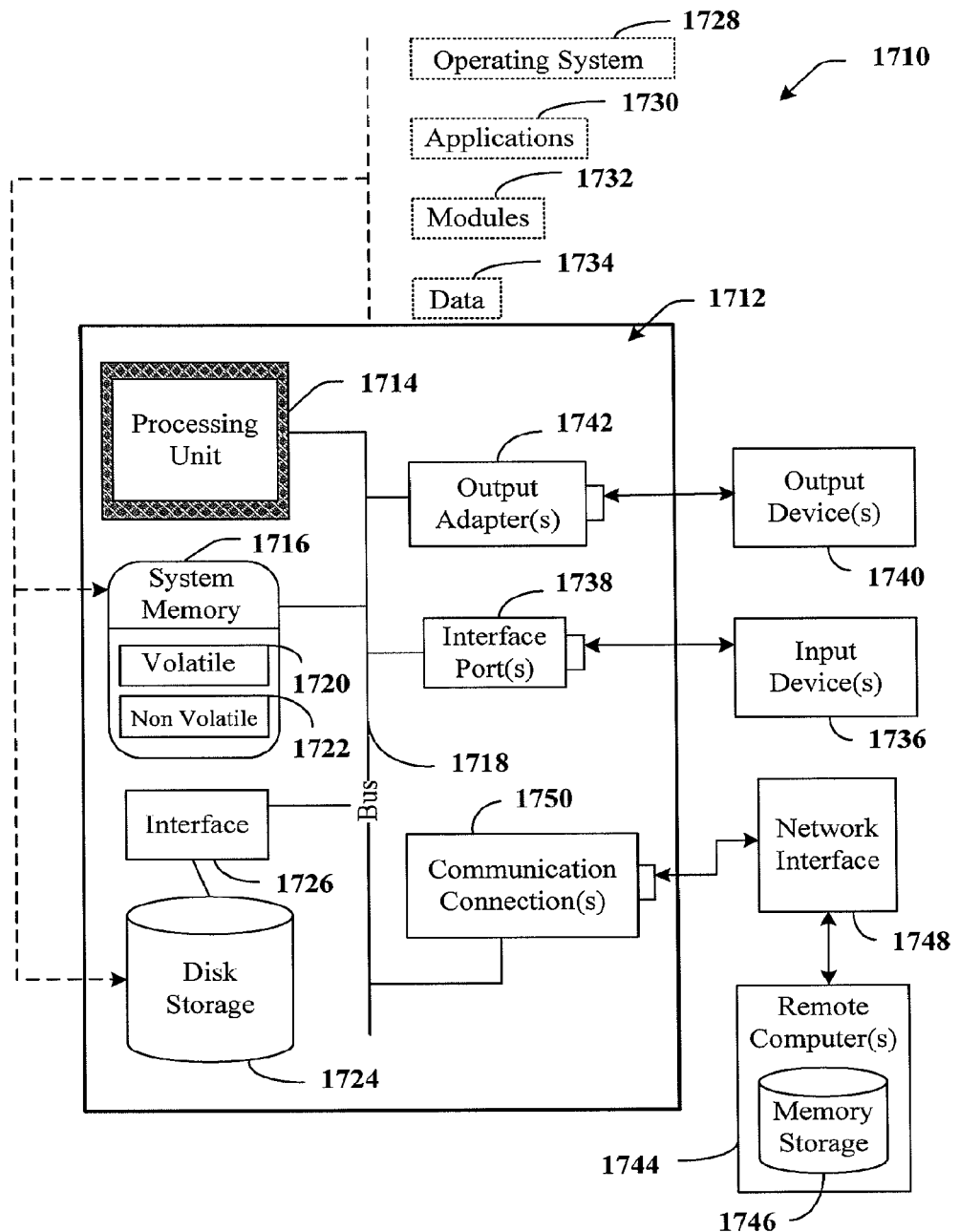
FIG. 17 is a schematic block diagram illustrating a suitable operating environment.

In order to provide additional context for various aspects of the claimed subject matter, FIG. 17 and the following discussion are intended to provide a brief, general description of a suitable operating environment 1710 in which various aspects may be implemented. While the claimed subject matter is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1710 is only one example of a suitable operating environment and is not intended to suggest any limitation as to the scope of use or functionality of the features described herein. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 17, an exemplary environment 1710 that can be employed in connection with determining when to provide information to a user while traveling includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI). The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable ROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/nonremovable, volatile/nonvolatile computer storage media. FIG. 17 illustrates, for example a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). For instance, a DVD-ROM drive can be employed in connection with reading video content from a DVD. To facilitate connection of the disk storage devices 1724 to the system bus 1718, a removable or nonremovable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the subject invention can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, remote control, and the like. As described above, advertisements can be provided to a user upon receipt of user input. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740. Output adapter 1742 is provided to illustrate that there are some output devices 1740 like monitors, speakers, and printers among other output devices 1740 that require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

Figure 18:
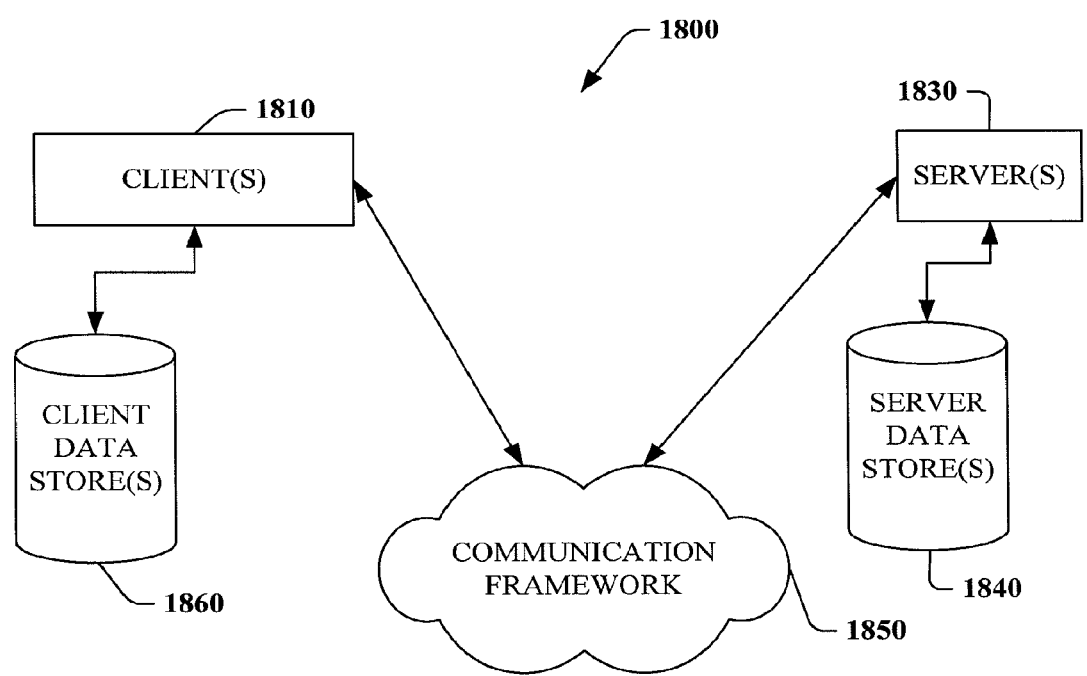
FIG. 18 is a schematic block diagram of a sample-computing environment.

FIG. 18 is a schematic block diagram of a sample-computing environment 1800 with which the claimed subject matter can interact. The system 1800 includes one or more client(s) 1810. The client(s) 1810 can be hardware and/or software (e.g., threads, processes, computing devices). The system 1800 also includes one or more server(s) 1830. The server(s) 1830 can also be hardware and/or software (e.g., threads, processes, computing devices). The servers 1830 can house threads to perform transformations by employing the claimed subject matter, for example. One possible communication between a client 1810 and a server 1830 can be in the form of a data packet adapted to be transmitted between two or more computer processes. The system 1800 includes a communication framework 1850 that can be employed to facilitate communications between the client(s) 1810 and the server(s) 1830. The client(s) 1810 are operably connected to one or more client data store(s) 1860 that can be employed to store information local to the client(s) 1810. Similarly, the server(s) 1830 are operably connected to one or more server data store(s) 1840 that can be employed to store information local to the server(s) 1830. In one particular example, the server(s) can include an alerting component that analyzes messages intended for a user and determines whether or not to delay the messages until the user is stopped. Similarly, the server(s) can include components that enable probability distributions to be created with respect to when a user will stop and how long the user will stop within a traffic system given current data relating to the user and/or the traffic system.

In an embodiment, an information delivery system comprises at least one processor executing the following computer-executable components: a receiver component that receives information about at least one of movement, velocity, acceleration, and location of a user over time; a computation component that determines when the user will be stopped based at least in part upon the received information; and an alerting component that determines when to provide the user with an alert based at least in part upon the received information and the determined time when the user will be stopped.

In an embodiment of the system, the receiver component receives an indication that the user is stopped from a sensor; the computation component generates a probability distribution relating to how long the user will remain stopped based at least in part upon the received information about at least one of movement, velocity, acceleration, and location of the user over time.

In an embodiment of the system, the alerting component determines when to provide the user with the alert based at least in part upon the probability distribution relating to how long the user will remain stopped.

In an embodiment of the system, the information about at least one of movement, velocity, acceleration, and location of the user over time is obtained from one or more of a car speedometer, an accelerometer, and a GPS system.

In an embodiment of the system, the receiver component receives an indication that the user is moving from a sensor, and the computation component generates a probability distribution relating to when the user will become stopped and a length of the stop based at least in part upon the information about at least one of movement, velocity, acceleration, and location of the user over time.

In an embodiment of the system, the alerting component determines when to provide information to the user based at least in part upon the probability distribution relating to when the user will become stopped and a length of the stop.

In an embodiment of the system, the computation component comprises a transition component that determines at least one of when the user will transition between traffic patterns and a length of time the user will reside within a particular traffic pattern.

In an embodiment of the system, the alerting component determines when to provide the user with information based at least in part upon one or more predefined rules.

In an embodiment, the system further comprises: a valuation component that analyzes content of the information to generate a measure of value of the information.

In an embodiment of the system, the alerting component comprises a deferral component that determines a measure of cost associated with deferring provision of the information to the user; and the alerting component determines when to provide the user with the information based at least in part upon the measure of cost.

In an embodiment, an electronic device comprises a notification system, the device comprising: a display; a processor; a computer readable storage medium encoded with computer executable instructions that, when executed by the processor, perform a method comprising: receiving a parameter through a user interface, the parameter defining a user preference for receiving messages while in an automobile; sensing conditions associated with a user; projecting a characteristic of a user stop based on the sensed conditions; determining whether to present the message to the user based on the projected characteristic of the user stop and the user preference; and selectively presenting the message to the user, the selectively presenting comprising, based on the determining: presenting a first message to the user while the user is driving the automobile; and deferring delivery of a second message to the user until the user is stopped.

In an embodiment of the electronic device, the parameter indicates a minimum projected duration of a stop during which the user wishes to receive messages.

In an embodiment of the electronic device, the parameter indicates a maximum projected time until a stop during which the user wishes to defer receipt of messages.

In an embodiment of the electronic device, the determining further comprises: analyzing content of the first message to determine a cost of deferring delivery of the first message until a projected stop meeting the user preference.

In an embodiment of the electronic device, the receiving the parameter further comprises receiving user input indicating a context in which the user preference applies.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A methodology for determining when to provide a user with information comprising the following computer-executable acts:
   employing a processor to execute computer executable instructions stored in memory to perform the following acts:
      receiving data that is indicative of a state of a user within a system and state of the system, the received data comprising movement of the user over time;
      projecting a duration of a user stop, the projection being based at least in part upon the received data and at least in part upon analyzing changes in stability of a radio signal associated with the user to determine an indication of user movement;
      receiving information intended for the user;
      analyzing at least one parameter of the information, the at least one parameter comprising at least one of content of the information, source of the information, device that the information is directed towards, priority of the information, sender of the information, or time the information was initially sent;
      determining a measure of value with respect to providing the information to the user based at least in part on the at least one parameter; and
      determining when to provide the information to the user based at least in part upon the projected duration, the analysis of the at least one parameter and the determined measure of value.

2. The methodology of claim 1, wherein projecting the duration of the user stop comprises:
   determining a probability distribution relating to how long the user will be stopped, the determination is based at least in part upon the analyzed changes in stability.

3. The methodology of claim 1, wherein:
   the methodology further comprises determining a measure of cost with respect to deferring the information as time progresses; and
   said determining when to provide the information to the user is further based on the measure of cost.

4. The methodology of claim 1, wherein:
   the methodology further comprises projecting a time until the user stop; and
   said determining when to provide the information to the user is further based on the a measure of cost of deferring provision of the information for the projected time until the user stop.

5. The methodology of claim 1, wherein:
   the methodology further comprises determining an amount of time needed to review the received information; and
   said determining when to provide the information to the user is further based upon the determined amount of time relative to the projected duration.

6. The methodology of claim 1, wherein said receiving information intended for the user comprises:
   receiving at least one of a message, an alert, multimedia, or an advertisement intended for the user.

7. A system for determining when to provide a user with information comprising:

a receiver component configured to receive data that is indicative of a state of a user within a system and state of the system, the received data comprising movement of the user over time;

a computation component configured to project a duration of a user stop, the projection being based at least in part upon:
  the received data; and
  changes in stability of a radio signal associated with the user to determine an indication of user movement;

an alerting component configured to receive information intended for the user, and to analyze at least one parameter of the information, the at least one parameter comprising at least one of content of the information, source of the information, device that the information is directed towards, priority of the information, sender of the information, or time the information was initially sent; and a valuation component configured to determine a measure of value with respect to providing the information to the user based at least in part on the at least one parameter; and the alerting component configured to determine when to provide the information to the user based at least in part upon the projected duration, the analysis of the at least one parameter and the determined measure of value.

8. The system of claim 7, wherein the computation component is configured to analyze the changes in stability, and to determine a probability distribution relating to how long the user will be stopped, the probability distribution determined based at least in part upon the analyzed changes in stability.

9. The system of claim 7, wherein the alerting component comprises:
  a deferral component configured to determine a measure of cost with respect to deferring the information as time progresses; and
  the alerting component is configured to determine when to provide the information to the user based further on the measure of cost.

10. The system of claim 7, wherein the computation component is configured to project a time until the user stop; and
  the alerting component is configured to determine when to provide the information to the user based further on the a measure of cost of deferring provision of the information for the projected time until the user stop.

11. The system of claim 7, wherein the alerting component comprises:
  a deferral component configured to determine an amount of time needed to review the received information; and
  the alerting component is configured to determine when to provide the information to the user based further upon the determined amount of time relative to the projected duration.

12. The system of claim 7, wherein the received information intended for the user includes at least one of a message, an alert, multimedia, or an advertisement.

13. An electronic device comprising a notification system, the device comprising:
  a display;
  a processor; and
  a computer readable storage medium encoded with computer executable instructions that, when executed by the processor, perform a method comprising:
    receiving data that is indicative of a state of a user within a system and state of the system, the received data comprising movement of the user over time;
    projecting a duration of a user stop, the projection being based at least in part upon the received data and at least in part upon analyzing changes in stability of a radio signal associated with the user to determine an indication of user movement;
    receiving information intended for the user;
    analyzing at least one parameter of the information;
    determining a measure of value with respect to providing the information to the user based at least in part on the at least one parameter; and
    determining when to provide the information to the user based at least in part upon the projected duration, the analysis of the at least one parameter and the determined measure of value.

14. The electronic device of claim 13, wherein said projecting the duration of the user stop comprises:
  determining a probability distribution relating to how long the user will be stopped, the probability distribution determination is based at least in part upon the analyzed changes in stability.

15. The electronic device of claim 13, wherein the method further comprises:
  determining a measure of cost with respect to deferring the information as time progresses; and
  said determining when to provide the information to the user is further based on the measure of cost.

16. The electronic device of claim 13, wherein the method further comprises:
  projecting a time until the user stop; and
  said determining when to provide the information to the user is further based on the a measure of cost of deferring provision of the information for the projected time until the user stop.

17. The electronic device of claim 13, wherein the method further comprises:
  determining an amount of time needed to review the received information; and
  said determining when to provide the information to the user is further based upon the determined amount of time relative to the projected duration.

18. The electronic device of claim 13, wherein said determining an amount of time needed to review the received information comprises at least one of:
  determining a time of a voice mail of the received information,
  determining a time to read an email of the received information based at least in part upon a length of the email, or
  determining a length of an advertisement of the received information.

19. The electronic device of claim 13, wherein said receiving information intended for the user comprises:
  receiving at least one of a message, an alert, multimedia, or an advertisement intended for the user.

20. The electronic device of claim 13, wherein the information is a message, and the method further comprises:
  scanning the message to determine an importance of the message, including at least one of
    analyzing spoken words left in the message to determine an urgency of the message,
    analyzing voice inflections and tones in connection with inferring an urgency of the message, or
    reviewing language within the message to determine an amount of urgency associated the message.

* * * * *